United States Patent [19]
Fujioka

[11] Patent Number: 6,040,786
[45] Date of Patent: Mar. 21, 2000

[54] RECOGNITION SYSTEM AND RECOGNITION METHOD FOR NON-CONTACT IC CARDS

[75] Inventor: Shuzo Fujioka, Itami, Japan

[73] Assignee: Mitsubishi Denki Kabushiki Kaisha, Tokyo, Japan

[21] Appl. No.: 09/116,196

[22] Filed: Jul. 16, 1998

[30] Foreign Application Priority Data

Jan. 16, 1998 [JP] Japan .................................. 10-006463

[51] Int. Cl.[7] .................................................. G08G 1/00
[52] U.S. Cl. ........................................ 340/928; 235/384
[58] Field of Search .............................. 340/928; 235/384

[56] References Cited

U.S. PATENT DOCUMENTS 5,872,525  2/1999  Fukasawa et al. ...................... 340/928

FOREIGN PATENT DOCUMENTS 4-362797  12/1992  Japan .
9006934   1/1997   Japan .

*Primary Examiner*—Harold I. Pitts

[57] ABSTRACT

A recognition system for non-contact IC cards that avoids the collision of response signals with a simple construction. A non-contact IC card in this system has a first transmitter that immediately transmits a response signal at a predetermined time slot for a first polling trial by the reader/writer and a second transmitter that transmits a response signal at a randomly time slot from a predetermined number of succeeding time slots, in response to a subsequent polling trial by the reader/writer. A reader/writer in this system has a polling unit that waits for the return of a response signal from a non-contact IC card at the predetermined time slot during the execution of a first polling trial and waits for the return of a response signal from a non-contact IC card at the randomly selected time slot during the execution of the subsequent polling trials.

10 Claims, 18 Drawing Sheets

RECOGNITION SYSTEM AND RECOGNITION METHOD FOR NON-CONTACT IC CARDS

BACKGROUND OF THE INVENTION

1. Field of the Invention

The present invention relates to a recognition method of recognizing a plurality of non-contact IC cards and a recognition system for implementing that method.

2. Description of the Related Art

So far, a so-called polling selective method has been employed for communication between IC cards that transfer data using electromagnetic induction and the like and a reader/writer that recognizes the IC cards. The polling-selective method is a communication method that establishes a one-to-one correspondence between the reader/writer and the IC cards so that the reader/writer can sequentially poll the IC cards.

In the above polling selective method, a plurality of non-contact IC cards simultaneously exist in the communication area of one reader/writer. If more than one IC cards transmit response signals to the reader/writer in answering the reader/writer's polling trial, then these response signals collide, so that neither of the non-contact IC cards can perform normal communication with the reader/writer.

In order to solve the above problem that occurs from the simultaneous issuing of response signals by a plurality of IC cards in answering the reader/writer's polling trial, a radio recognition apparatus was disclosed in Japanese Patent Laid-Open Publication No. 9-6934. The radio recognition apparatus comprises recognition cards (equivalent to non-contact IC cards), each of which has a random-number generator and issues a response signal after a delay time determined by a random number generated by the random-number generator, and a transmitting/receiving decoder (equivalent to reader/writer), which recognizes the recognition cards.

However, in this radio recognition apparatus, the delay time until a recognition card transmits a response signal after receiving the reader/writer's polling trial is determined by a random number. Therefore, even if only one recognition card exists, so that the response signal could be sent immediately, the response signal cannot be sent until the delay time determined by the random number passes, so that the response characteristic deteriorates.

Also, a multi-access method for non-contact cards was disclosed in Japanese Patent Laid-Open Publication No. 4-362797. In this multi-access method, each child authority (non-contact card) that has received a read command issued from the parent authority examines a time sharing area addressed in the read command. If a temporary ID of its own is not in the area, then the child authority transmits its temporary ID to an empty location of the time sharing area determined by a generated random number to let the parent authority recognize the ID. In this way, the parent authority can simultaneously perform communication with a plurality of its child authorities in time sharing.

However, in the above multi-access method for non-contact cards, each child authority needs an extra circuit for recognizing a temporary ID sent from the parent authority, so that the apparatus becomes complex with higher costs.

SUMMARY OF THE INVENTION

The present invention has been therefore devised to solve the above problems. Its object is to provide non-contact IC cards that can avoid with simple circuits the collision of the response signals that occurs when a plurality of non-contact IC cards coexist in the communication area of the reader/writer.

Another object of the present invention is to provide a recognition system for non-contact IC cards that consists in a reader/writer that communicates with the IC cards.

Still another object of the present invention is to provide a recognition system for the non-contact IC cards.

In order to achieve these objects, the recognition system for non-contact IC cards in accordance with the present invention comprises a plurality of non-contact IC cards and a reader/writer that recognizes the non-contact IC cards. The non-contact IC card has a first response signal transmitting means that immediately transmits a first response signal at a predetermined time slot in response to a first polling trial by the reader/writer and a second response signal transmitting means that transmits a second response signal at a time slot randomly selected from a predetermined number of succeeding time slots, in response to a subsequent polling trial by the reader/writer. The reader/writer has a polling means that waits for the return of the first response signal from each of non-contact IC cards at a predetermined time slot during the execution of a first polling trial and waits for the return of a second response signal from a non-contact IC card at a predetermined number of time slots during the execution of a sub sequent polling trial.

In this construction, the non-contact IC card immediately transmits a first response signal in answering a first polling trial. If there exist a plurality of nun-contact IC cards in the reader/writer's communication area, and if response signals from these IC cards collide, so that the reader/writer again performs polling, then each of these IC cards transmits a response signal at a slot randomly selected from a predetermined number of time slots. In this way, the present recognition system makes possible swift transmission of a response signal in the case where only one recognition card exists, and also can effectively avoid the collision of response signals in the case where a plurality of non-contact IC cards coexist in the communication area.

The second response signal transmitting means in the above non-contact IC card preferably has a random-number generating circuit to select a time slot from a predetermined number of time slots, based on a random number generated by the random-number generating circuit, and transmits a response signal at the selected slot. In this case, in response to a second or later polling trial by the reader/writer, the IC card can select a slot from a predetermined number of time slots, based on a random number generated by the random-number generating circuit, and transmits a response signal at the selected slot. Therefore, the collision of response signals in the case where a plurality of IC cards coexist in the reader/writer's communication area can be effectively avoided.

Alternatively, the second response signal transmitting means in the above non-contact IC card preferably regards the CRC signal accompanying the response signal transmitted by the first response signal transmitting means as randomly arranged bit-data, selects a slot from a predetermined number of time slots, based on the bit-data at different bit places depending on the trial number of polling, and transmits a response signal at the selected slot. In this case, in response to a second or later polling trial by the reader/writer, the IC card selects a slot from a predetermined number of time slots, based on the bit-data at different bit places depending on the trial number of polling, and transmits a response signal at the selected slot. Therefore, the collision of response signals in the case where a plurality of IC cards coexist in the reader/writer's communication area can be effectively avoided in a construction without a random-number generating circuit.

In a preferred embodiment of the present invention, the recognition system for non-contact IC cards comprises non-contact IC cards and a reader/writer that recognizes the non-contact IC cards. Each of the non-contact IC cards has a first response signal transmitting means and a second response signal transmitting means. The first response signal transmitting means immediately transmits a response signal in answering the reader/writer's first polling trial. The second response signal transmitting means decides whether to transmit a response signal or not for the reader/writer's second or later polling trial, based on random bit-data, and transmits a response signal following the decision. The reader/writer has a polling means that waits for a response signal from a non-contact IC card.

According to this construction, the present recognition system makes possible swift transmission of response signals in the case where only one non-contact IC card exists in the reader/writer's communication area, and also can effectively avoid the collision of response signals in the case where a plurality of non-contact IC cards coexist in the communication area.

In this case, the second response signal transmitting means preferably has a random-number generating circuit, decides whether to transmit a response signal or not for the reader/writer's second or later polling trial, based on a random number generated by the random-number generating circuit, and transmits a response signal following the decision.

Alternatively, the second response signal transmitting means preferably regards the CRC signal accompanying the response signal transmitted by the first response signal transmitting means as randomly arranged bit-data, decides whether to transmit a response signal or not, based on the bit-data at different bit places depending on the trial number of polling, and transmits a response signal following the decision.

In either embodiment of the present invention, the above non-contact IC card may have a response prohibiting means that prohibits the transmission of a response signal to the reader/writer, once the IC card has been appointed by the reader/writer and predetermined command proceeding has been executed.

The recognition method for non-contact IC cards in accordance with the present invention is employed by a recognition system for non-contact IC cards that comprises non-contact IC cards and a reader/writer that recognizes the non-contact IC cards. According to the recognition method, each of the non-contact IC cards immediately transmits a response signal at a predetermined time slot for the reader/writer's first polling and transmits a response signal at a slot randomly selected from a predetermined number of succeeding time slots for the reader/writer's second or later polling trial. The reader/writer waits for the return of a response signal from a non-contact IC card at a predetermined time slot during the execution of the first polling trial and waits for the return of a response signal from a non-contact IC card at a predetermined number of succeeding time slots during the execution of a second or later polling trial.

As an alternative method, each of the above non-contact IC cards immediately transmits a response signal for the reader/writer's first polling trial and decides whether to transmit a response signal or not, based on random bit data, for the reader/writer's second or later polling trial, to transmit a response signal following the decision. In this case, the reader/writer waits for the return of a response signal at a predetermined time slot after polling.

In either method of the present invention, each of the above non-contact IC cards preferably does not transmit a response signal for the reader/writer's polling trial, once the IC card has been appointed by the reader/writer and the predetermined command processing has been executed.

BRIEF DESCRIPTION OF THE DRAWINGS

These and other objects and features of the present invention will become clear from the following description taken in conjunction with the accompanying drawings throughout which like parts are designated by like reference numerals, and in which.

DETAILED DESCRIPTION OF THE PREFERRED EMBODIMENTS

The preferred embodiments according to the present invention will be described below in conjunction with the attached drawings.

(1) Recognition Method for Non-contact IC Cards

Figure 1A:
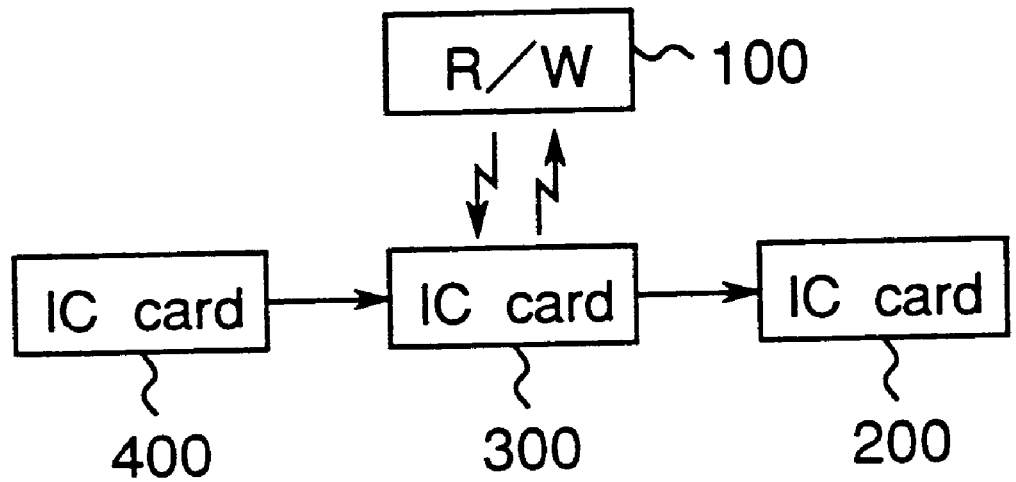
FIG. 1A is a schematic diagram illustrating a usage example of a recognition system for non-contact IC cards in accordance with the present invention.

The recognition method for non-contact IC cards of the present invention is supposed to be employed, for example, in automatic ticket examiners of a subway system. Specifically, as shown in FIG. 1A, suppose that three people respectively having non-contact IC cards 200, 300, 400, which function as commutation tickets or coupon tickets or the like, successively pass in front of a reader/writer 100 that functions as an automatic ticket examiner. Reader/writer 100 successively recognizes IC cards 200, 300, 400 that enter the reader/writer's communication area, when the three people pass in front of reader/writer 100. Reader/writer then reads out, from each card, information about the class of the card, such as whether it is a commutation ticket or a coupon ticket, the expiration for a commutation ticket, and the remaining numbers for a coupon ticket, and renews the information of the card if necessary.

Here, one of the people passing at the automatic ticket examiner may have several non-contact IC cards. Suppose that a person passing in front of reader/writer 100, using a non-contact IC card that is a coupon ticket, also has a non-contact IC card 200 as a reserve coupon ticket 500. In this case, more than one non-contact IC card simultaneously enters the communication area of reader/writer 100. The recognition system for non-contact IC cards of the present invention performs the recognition as described in the following procedure.

First, each of non-contact IC cards 200, 500 transmits a response signal at a first time slot, that is, at a first timing point, in answering a polling trial by reader/writer 100. In this way, if only one non-contact IC card exists in the communication area of reader/writer 100, then the card can swiftly respond.

However, reader/writer 100 performs polling again in the present example, since the response signals transmitted from two non-contact IC cards 200, 500 collide to cause a failure in receiving. In answering the second polling trial, each card transmits a response signal at a timing point randomly selected from the succeeding time slots of more than one, for example four slots. Alternatively, each card decides whether to transmit a response signal or not, based on a random number that is unpredictable, and follows the decision. Reader/writer 100 recognizes the non-contact IC card that transmits a response signal at the earliest time and executes predetermined processing for the recognized non-contact IC card.

Figure 1B:
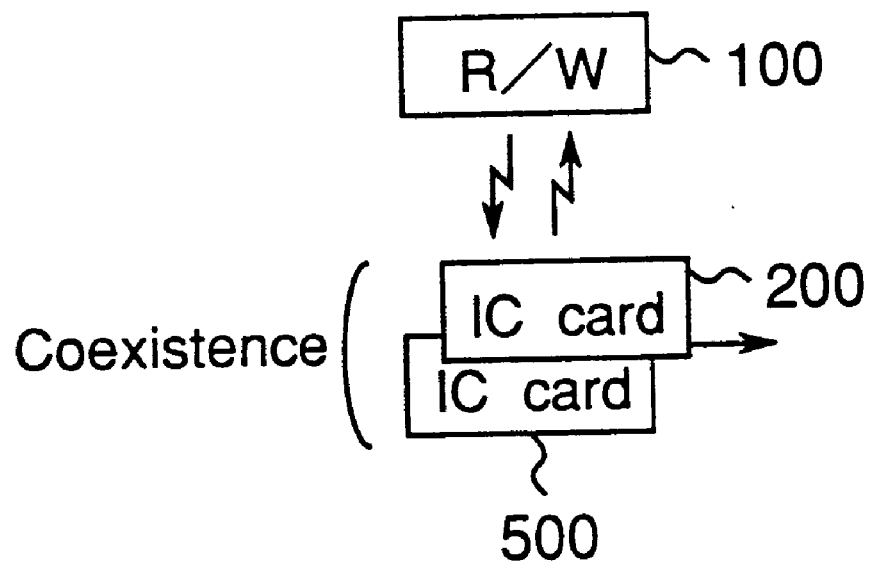
FIG. 1B is a schematic diagram illustrating another usage example of a recognition system for non-contact IC cards in accordance with the present invention.

In this way, the present method of recognizing non-contact IC cards secures swift responsiveness in the case where non-contact IC cards pass through the communication area of reader/writer 100 one by one, as shown in FIG. 1A. The present method also can effectively avoid the collision of response signals in the case where a plurality of non-contact IC cards coexist in the communication area of reader/writer 100, as shown in FIG. 1B.

Further, a card that has undertaken command processing (ticket examination processing in the above example) may be prohibited from transmitting a response signal again in answering a later polling trial by reader/writer 100. By this construction, the collision of response signals from the two cards 200, 500 is more effectively avoided. The fifth to ninth embodiments of the present invention described later will clarify this point. In the following, concerning the construction and operation of reader/writer 100 and non-contact IC cards 200, 300, . . . that employ the above method, the first to ninth embodiments are described in the following in conjunction with the attached figures.

(2) First Embodiment

The recognition system for non-contact IC cards of the first embodiment comprising reader/writer 100 and non-contact IC cards 200, 300, 400, . . . is described in the following. The constructions of the non-contact IC cards 200, 300, 400 are the same, so that non-contact IC card 200 is used for the description, as well as in the description of the second to ninth embodiments.

Figure 2:
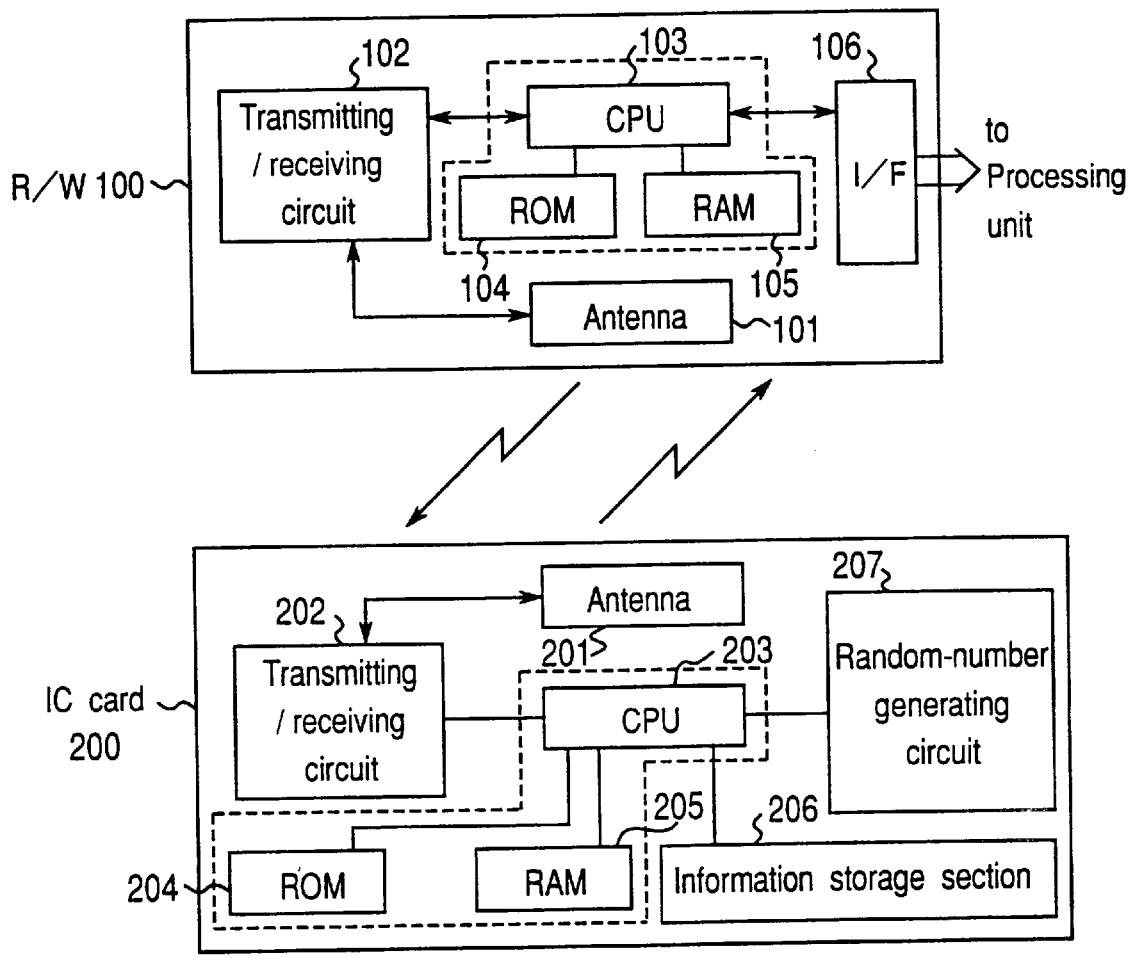
FIG. 2 is a block diagram illustrating the construction of the reader/writer and a non-contact IC card comprising a recognition system for non-contact IC cards in accordance with a first preferred embodiment of the present invention.

FIG. 2 is a block diagram illustrating the configuration of reader/writer 100 and non-contact IC card 200 in accordance with the first embodiment. Reader/writer 100 comprises an antenna 101, a transmitting/receiving circuit 102, a CPU 103 that is a central processor unit, a ROM 104 in which a control program for polling non-contact IC cards is stored, a RAM 105 that is used for the execution of the program, and an interface 106 for outputting the processing results of CPU 103 to each processing unit. The circuit block surrounded by dotted lines and containing CPU 103, ROM 104, and RAM 105 constitutes a control circuit.

Non-contact IC card 200 comprises an antenna 201, a transmitting/receiving circuit 202, a CPU 203 that is a central processing unit, a ROM 204 in which a control program for answering a polling trial by reader/writer 100 is stored, a RAM 205 that is used for the execution of the program, an information storage section 206 that holds its inherent information, for example, unique information such as the expiration of the card and the effective travel zone in a non-contact IC card that functions as a coupon ticket, and a random number generating circuit 207 that is used for determining the timing of transmitting a response signal in answering a second or later polling trial by reader/writer 100. The circuit block surrounded by dotted lines and containing CPU 203, ROM 204, and RAM 205 constitutes a control circuit.

Reader/writer 100 and non-contact IC card 200 constitute a software execution circuit that achieves predetermined communication functions by executing the programs stored in ROM 101 and ROM 204. Alternatively, the communication functions can be implemented by a control circuit implemented by hardware (hard logic).

Figure 3:
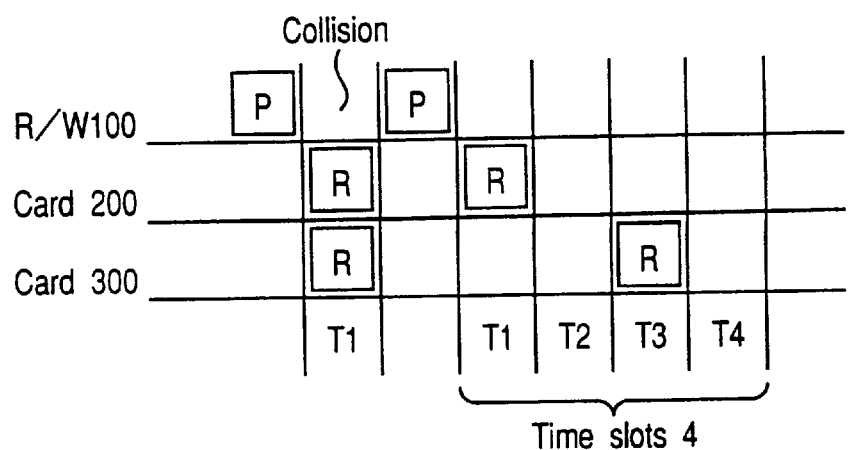
FIG. 3 is a timing chart illustrating communication between the reader/writer and a non-contact IC card in a recognition system for non-contact IC cards in accordance with the first preferred embodiment.

FIG. 3 is a timing chart illustrating communication between reader/writer 100 and non-contact IC cards 200, 300 (not illustrated) in the case where non-contact IC cards 200 and 300 coexist in the communication area of reader/writer 100. The constructions of non-contact IC cards 200 and 300 are the same. Their inherent information is basically of the same kind but different from each other.

After outputting a polling signal P, reader/writer 100 waits for a response signal to be transmitted from a non-contact IC card at a first time slot T1. Non-contact IC cards 200 and 300 that have received the polling signal from reader/writer 100 respectively immediately output a response signal R. In this case, the response signals from the two cards collide to cause a failure in receiving in reader/writer 100. Therefore, reader/writer 100 outputs a polling signal again and sets four time slots to wait for a response signal to be transmitted from a non-contact IC card.

Non-contact IC card 200 outputs a response signal at a time slot identified by a 2-bit random number generated by random-number generating circuit 207 installed therein. Non-contact IC card 300 outputs a response signal at a time slot identified by a 2-bit random number generated by random-number generating circuit 307 (not illustrated) installed therein. In the present example shown in FIG. 3, non-contact IC card 200 outputs a response signal at the time slot T1, and non-contact IC card 300 outputs a response signal at the time slot T4.

Thereafter, reader/writer 100 appoints the non-contact IC card 200 that has first transmitted a response signal, to demand predetermined command processing, such as the processing of receiving the inherent information. The processing after a response signal is returned from non-contact IC card 200 and the non-contact IC card is recognized by reader/writer 100 is the same as that in prior methods, so that its description is omitted from here.

Figure 4:
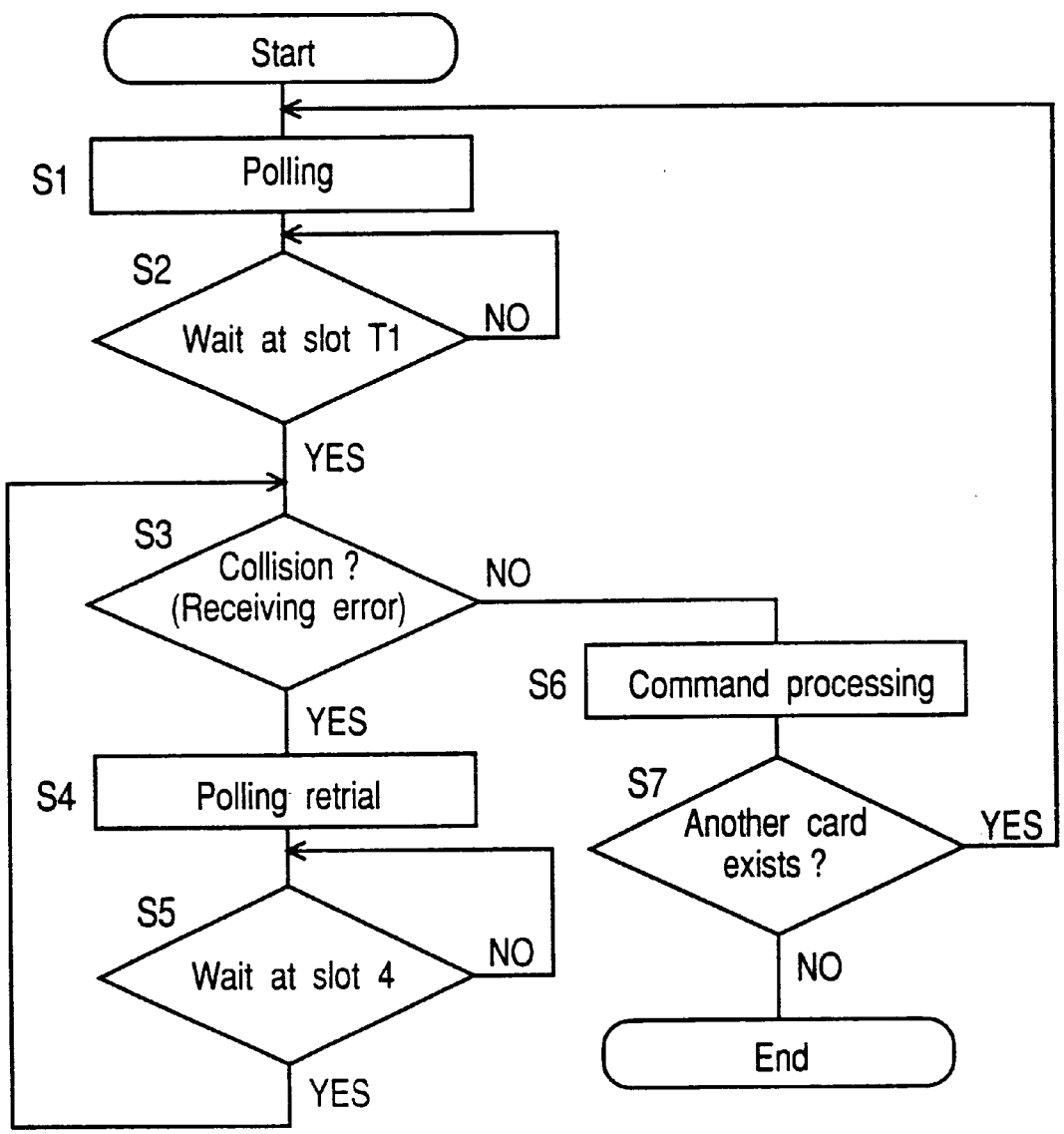
FIG. 4 is a flowchart of the communication processing steps executed by a reader/writer in accordance with the first preferred embodiment.

FIG. 4 is a flowchart of communication processing executed by reader/writer 100. Reader/writer 100 outputs a polling signal to non-contact IC card 200 that has entered the communication area (step S1) and waits for an answer from the non-contact IC card at the time slot T1 (NO in step S2).

If both non-contact IC card 200 and non-contact IC card 300 simultaneously transmit a response signal (YES in step S2), then normal communication is impossible (YES in step S3). In this case, reader/writer 100 outputs a polling signal again (step S4) and sets four time slots to wait for an answer from a non-contact IC card (NO in step S5). If reader/writer 100 receives a response signal from a non-contact IC card (YES in step S5), then the flow returns to step S3.

On the other hand, if a single response signal returns from one of non-contact IC cards to reader/writer 100 (YES in step S2 and NO in step S3), then reader/writer 100 executes predetermined command processing together with the non-contact IC card that has issued the received response signal (step S6). If other unprocessed cards exist (YES in step S7), then the flow returns to step S1. Here, the judgment whether other unprocessed cards exist or not is made, for example, in the following way. If step S3 has succeeded step S2, then reader/writer 100 judges that only one non-contact IC card exists. If step S3 has succeeded step S5, then reader/writer 100 judges that other unprocessed non-contact IC cards exist. If reader/writer 100 judges that no other unprocessed non-contact IC cards exist, then the flow of the present procedure is terminated.

Figure 5:
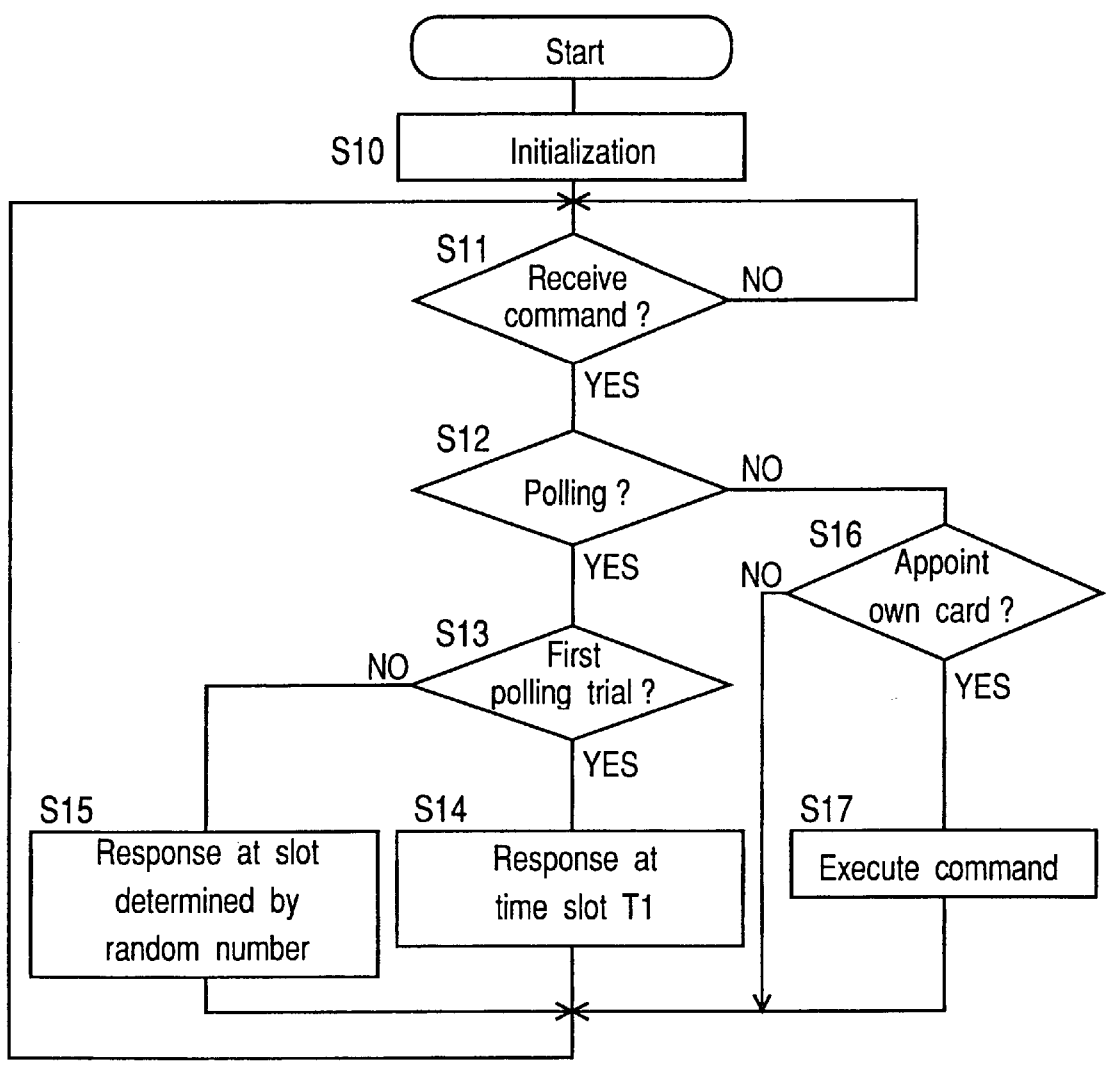
FIG. 5 is a flowchart of the communication processing steps executed by a non-contact IC card in accordance with the first preferred embodiment.

FIG. 5 is a flowchart of communication processing executed by the CPU 203 of non-contact IC card 200. The corresponding communication processing is also executed by the CPU 303 (not illustrated) of non-contact IC card 300. First, CPU 203 initializes the trial number of polling (step S10). Then CPU 203 waits for a command to be transmitted from reader/writer 100 (NO in step S11). If CPU 203 receives a command (YES in step S11) and if the command is a polling command (YES in step S12), then CPU 203 executes the following processing depending on the trial number.

If receiving a first polling trial (YES in step S13), then CPU 203 immediately outputs a response signal at the time slot T1 (step S14) and returns to step S11. If receiving a second or later polling trial (No in step S13), then CPU 203 outputs a response signal at a time slot determined by a 2-bit random number generated by random-number generating circuit 207 (step S15) and returns to step S11.

On the other hand, if CPU 203 receives a command demanding some processing other than polling (NO in step S12), and if the command appoints IC card 200 (YES in step S16), then CPU 203 executes the command processing such as the reading of the inherent information of IC card 200 (step S17) and returns to step S11. If the received command does not appoint IC card 200 (NO in step S16), then CPU 203 returns to step S11.

Figure 6:
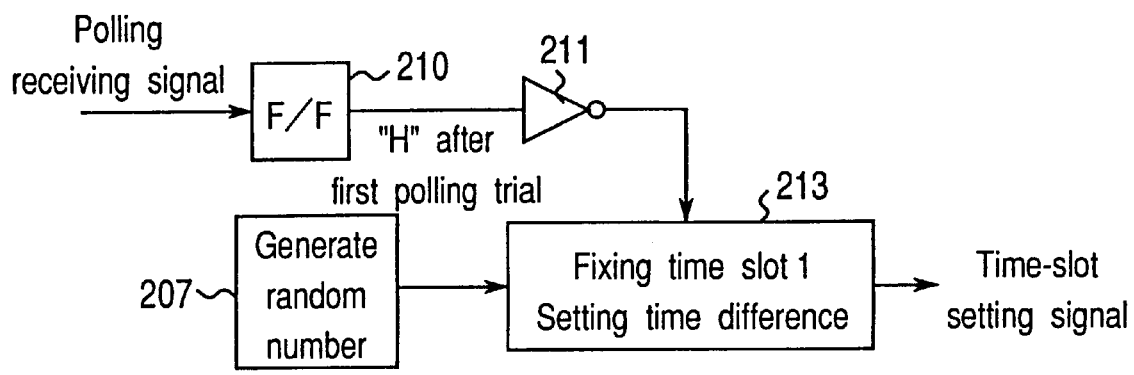
FIG. 6 is a block diagram illustrating some of the functions of the non-contact IC card implemented by hardware in accordance with the first preferred embodiment.

FIG. 6 is a block diagram illustrating the processing of the steps S13, S14, and S15 in the flowchart of FIG. 5 implemented by hardware. A flip-flop 210 outputs an "L" signal during the reset time and outputs an "H" signal after receiving a first polling trial. The signal output from flip-flop 210 is inverted by an inverter 211 and input to a time-slot setting circuit 213. The signal is applied to a display-enable terminal of time-slot setting circuit 213. If the signal is at "H," then time-slot setting circuit 213 outputs a signal that sets the time slot T1.

If the signal input through inverter 211 is at "L," then time-slot setting circuit 213 outputs a signal that sets one of the time slots T1 to T4 identified by the lowest 2 bits of the random number output from random-number generating circuit 207. For example, if the lowest 2 bits of the random number is "00," then the setting signal sets the time slot T1. If the lowest 2 bits of the random number is "01," then the setting signal sets the time slot T2. If the lowest 2 bits of the random number is "10," then the setting signal sets the time slot T3. If the lowest 2 bits of the random number is "11," then the setting signal sets the time slot T4.

(3) Second Embodiment

Figure 7:
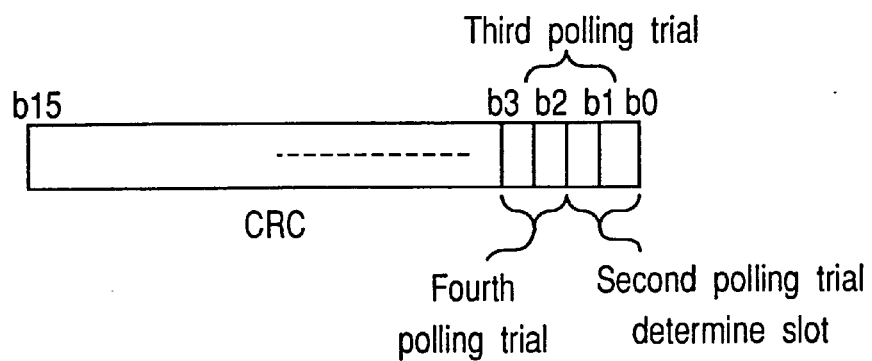
FIG. 7 is a diagram illustrating the process of extracting data from a CRC signal in accordance with a second preferred embodiment of the present invention.

A non-contact IC card 260 (not illustrated) employed in a recognition system for IC cards in accordance with the second embodiment is the one obtained by removing the random-number generating circuit 207 from the non-contact IC card 200 of the above first embodiment. The non-contact IC card 200 employed in the system of the first embodiment has identified the time slot at which a response signal is transmitted in answering a second or later polling trial, based on a 2-bit random number generated by random-number generating circuit 207. In place of the random number, the non-contact IC card 260 employed in the system of the second embodiment uses the CRC (cyclic redundancy check) signal accompanying the response signal transmitted to a reader/writer 110 in answering a first polling trial. In this case, as shown in FIG. 7, the value of the 2 bits used for identifying a time slot depending on the retrial number of polling is successively obtained from the first and second bits, the second and third bits, the third and fourth bits etc., from the lowest bit of the CRC signal.

By effectively using the CRC signal in this way, the random-number generating circuit 207 used in the non-contact IC card 200 employed in the system of the first embodiment can be removed, so that the construction is simplified.

The construction and operation of the reader/writer 110 that recognizes non-contact IC card 260 employed in the system of the second embodiment are the same as those of the reader/writer 100 employed in the system of the first embodiment, so that their description is omitted from here.

Figure 8:
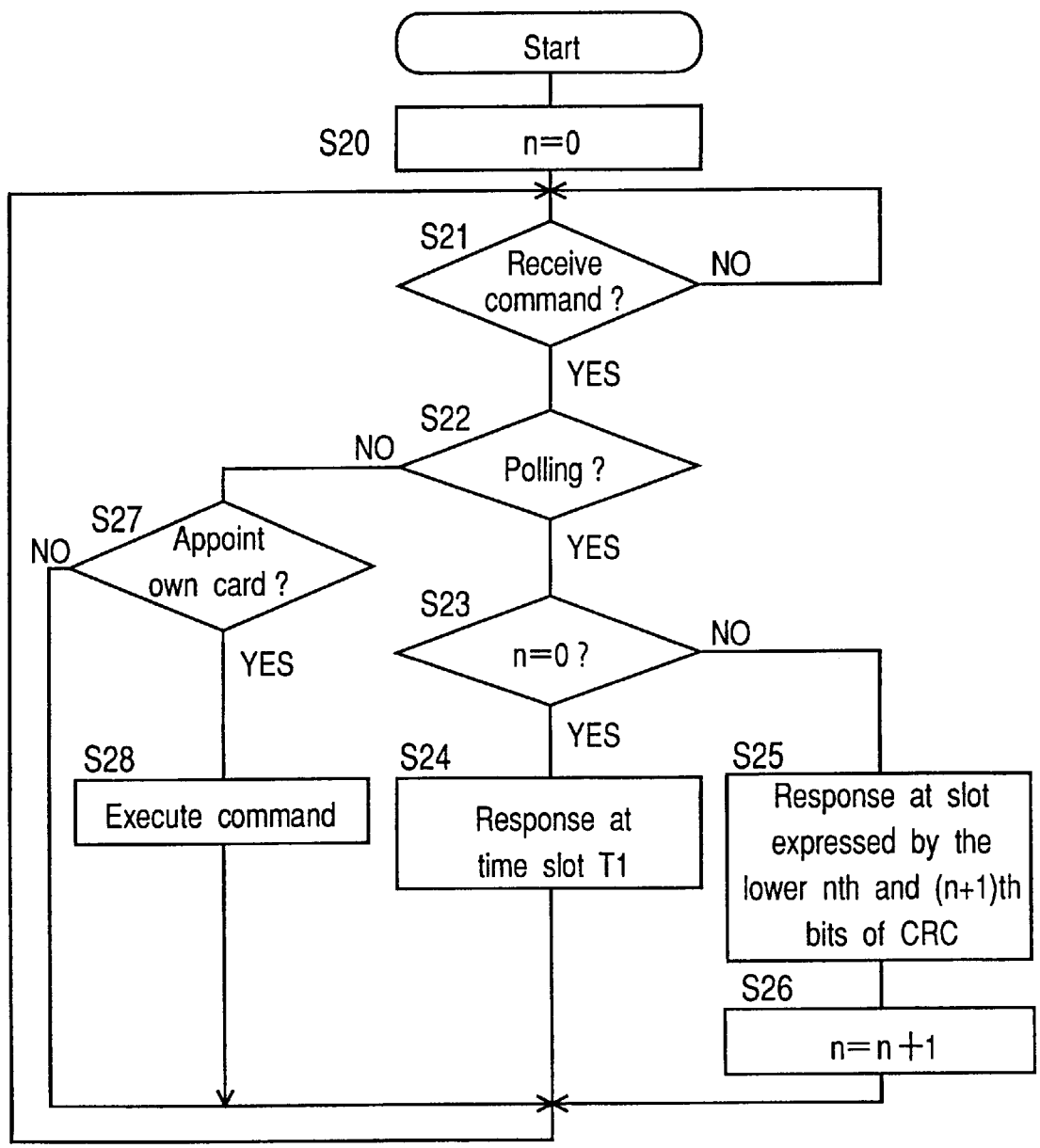
FIG. 8 is a flowchart of the communication processing steps executed by a non-contact IC card in accordance with the second preferred embodiment.

FIG. 8 is a flowchart of communication processing executed by the CPU (not illustrated) of non-contact IC card 260 that uses the CRC signal in place of random-number generating circuit 207. First, the CPU sets the value of a variable n that expresses the trial number of polling at 0 (step S20). Then the CPU waits for a command to be transmitted from reader/writer 100 (NO in step S21). If the CPU receives a command (YES in step S21) and if the command is a polling command (YES in step S22), then the CPU executes the following processing.

If the value of the variable n is 0 (YES in step S23), then the CPU judges that it has received a first polling trial. In this case, the CPU transmits a response signal at the time slot T1 (step S24) and returns to step S21.

If the value of the variable n is more than 0 (NO in step S23), then the CPU judges that it has received a second or later polling trial. In this case, the CPU outputs a response signal at a time slot expressed by the nth and (n+1)th bits from the lowest bit of the CRC signal accompanying the response signal transmitted for the first polling trial (step S25). Then the CPU increments the variable n by 1 (step S26) and returns to step S21.

On the other hand, if the CPU receives a command demanding some processing other than polling (NO in step S22), and if the command appoints IC card 260 (YES in step S27), then the CPU executes the command processing (step S28) and returns to step S21. If the received command does not appoint IC card 260 (NO in step S27), then the CPU returns to step S21.

Figure 9:
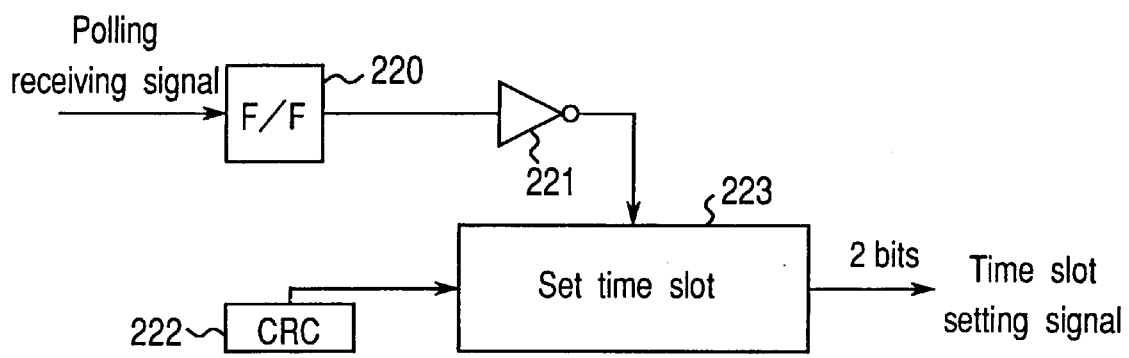
FIG. 9 is a block diagram illustrating some of the functions of the non-contact IC card implemented by hardware in accordance with the second preferred embodiment.

FIG. 9 is a block diagram illustrating the processing of the steps S23, S24, and S25 in the flowchart of FIG. 8 implemented by hardware. A flip-flop 220 outputs an "L" signal during the reset time and outputs an "H" signal after receiving a first polling trial. The signal output from flip-flop 220 is inverted by an inverter 221 and input to a time-slot setting circuit 223. The signal is applied to a display-enable terminal of time-slot setting circuit 223. If the signal is at "H," then time-slot setting circuit 223 outputs a signal that sets the time slot T1.

If the signal input through inverter 221 is at "L," then time-slot setting circuit 223 outputs a signal that sets one of the time slots T1 to T4 identified by the 2 bits in predetermined places of the CRC signal output from a CRC signal output circuit 222. Here, CRC signal output circuit 222 outputs the 2-bit data of the CRC signal in the places selected by the CPU. For example, if the polling is a second trial, then the CPU selects the first and second bits from the lowest bit in the CRC signal. If the value of the 2-bit data is "00," then time-slot setting circuit 223 outputs a signal that sets the time slot T1. If the value of the 2-bit data is "01," then time-slot setting circuit 223 outputs a signal that sets the time slot T2. If the value of the 2-bit data is "10," then time-slot setting circuit 223 outputs a signal that sets the time slot T3. If the value of the 2-bit data is "11," then time-slot setting circuit 223 outputs a signal that sets the time slot T4.

As described above, the non-contact IC card 260 employed in the recognition system for non-contact IC cards of the second embodiment implements a similar operation as in the system of the first embodiment without using a random-number generating circuit. By this means, the construction of a non-contact IC card is simplified, and costs are cut down.

(4) Third Embodiment

A non-contact IC card 261 (not illustrated) employed in the recognition system for non-contact IC cards of the third embodiment immediately transmits a response signal in answering a first polling trial by a reader/writer 120. Non-contact IC card 261 decides whether to transmit a response signal for a second or later polling trial, based on the lowest one bit of the random number generated by a random-number generating circuit, and transmits the response signal following the decision.

The reader/writer 120 employed in the system of the third embodiment, after performing polling, always waits for a response signal from a non-contact IC card at the time slot T1.

The constructions of reader/writer 120 and non-contact IC card 261 are the same as those of the reader/writer 100 and non-contact IC card 200 employed in the system of the first embodiment shown in FIG. 2.

Figure 10:
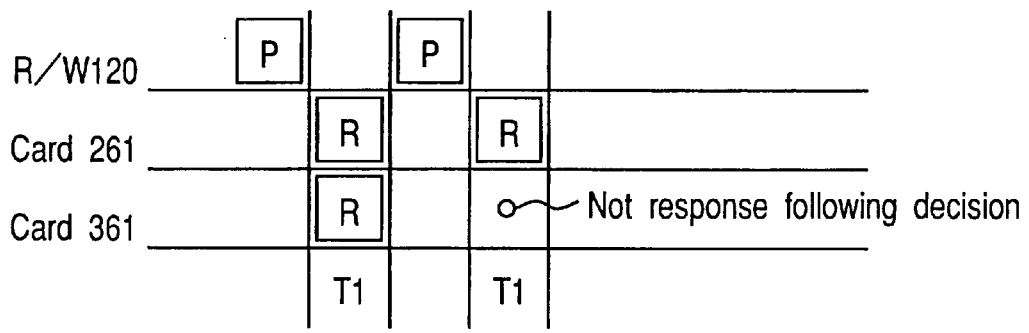
FIG. 10 is a timing chart illustrating communication between the reader/writer and a non-contact IC card in the recognition system for non-contact IC cards in accordance with a third preferred embodiment of the present invention.

FIG. 10 is a timing chart illustrating communication between reader/writer 120 and non-contact IC cards 261, 361 (not illustrated) in the case where non-contact IC cards 261 and 361 coexist in the communication area of reader/writer 120. The constructions of non-contact IC cards 261 and 361 are the same. Their inherent information is basically of the same kind but different from each other.

After outputting a polling signal P, reader/writer 120 waits for a response signal to be transmitted from a non-contact IC card at the time slot T1. Non-contact IC cards 261 and 361 that have received the polling signal from reader/writer 120 respectively immediately outputs a response signal R. In this case, the response signals from the two cards collide to cause a failure in receiving in reader/writer 120. Therefore, reader/writer 120 outputs a polling signal again to wait for a response signal to be transmitted from a non-contact IC card at the time slot T1.

Non-contact IC card 261 decides whether to transmit a response signal, based on a one-bit value of a random number generated by the random-number generating circuit (not illustrated) installed therein, and transmits a response signal following the decision. Non-contact IC card 361 decides whether to transmit a response signal, based on a one-bit value of a random number generated by the random-number generating circuit (not illustrated) installed therein, and transmits a response signal following the decision. In FIG. 10 of the present embodiment, non-contact IC card 261 transmits a response signal at the time slot T1, and non-contact IC card 361 does not transmit a response signal at the time slot T1.

Thereafter, reader/writer 120 appoints the non-contact IC card 261 that has transmitted a response signal, to demand predetermined command processing, such as the processing of receiving the inherent information. The processing after a response signal is returned from non-contact IC card 261 and the non-contact IC card is recognized by reader/writer 120 is the same as that in prior methods, so that its description is omitted from here.

Figure 11:
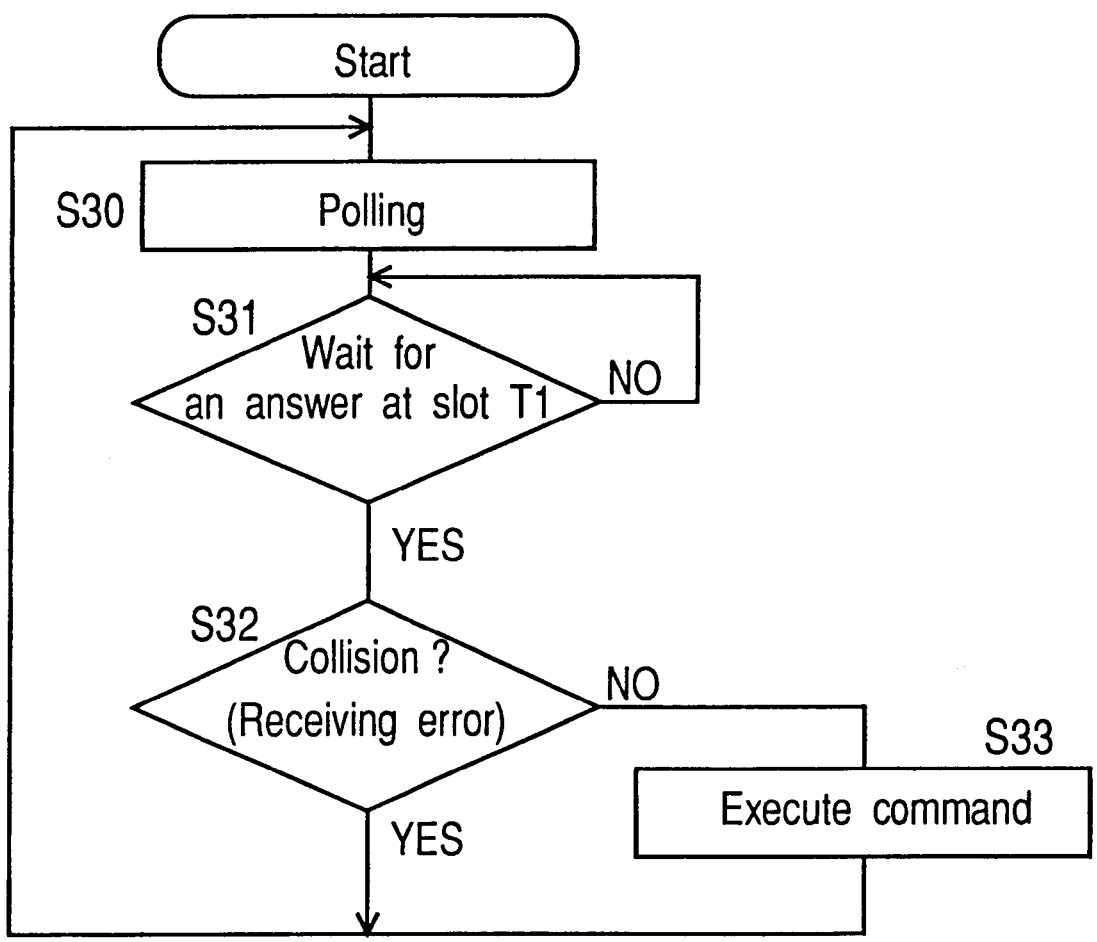
FIG. 11 is a flowchart of the communication processing steps executed by a reader/writer in accordance with the third preferred embodiment.

FIG. 11 is a flowchart of communication processing executed by reader/writer 120. Reader/writer 120 performs the polling of non-contact IC cards that have entered the communication area (step S30) and waits for an answer from a non-contact IC card at the time slot T1 (NO in step S31).

If a plurality of non-contact IC cards simultaneously transmit a response signal (YES in step S31), then normal communication is impossible (YES in step S32). In this case, reader/writer 120 returns to step S30 to perform polling again.

On the other hand, if receiving a single response signal from one of non-contact IC cards (NO in step S32), then reader/writer 120 executes predetermined command processing together with the non-contact IC card that has issued the received response signal (step S33) and returns to step S30.

Figure 12:
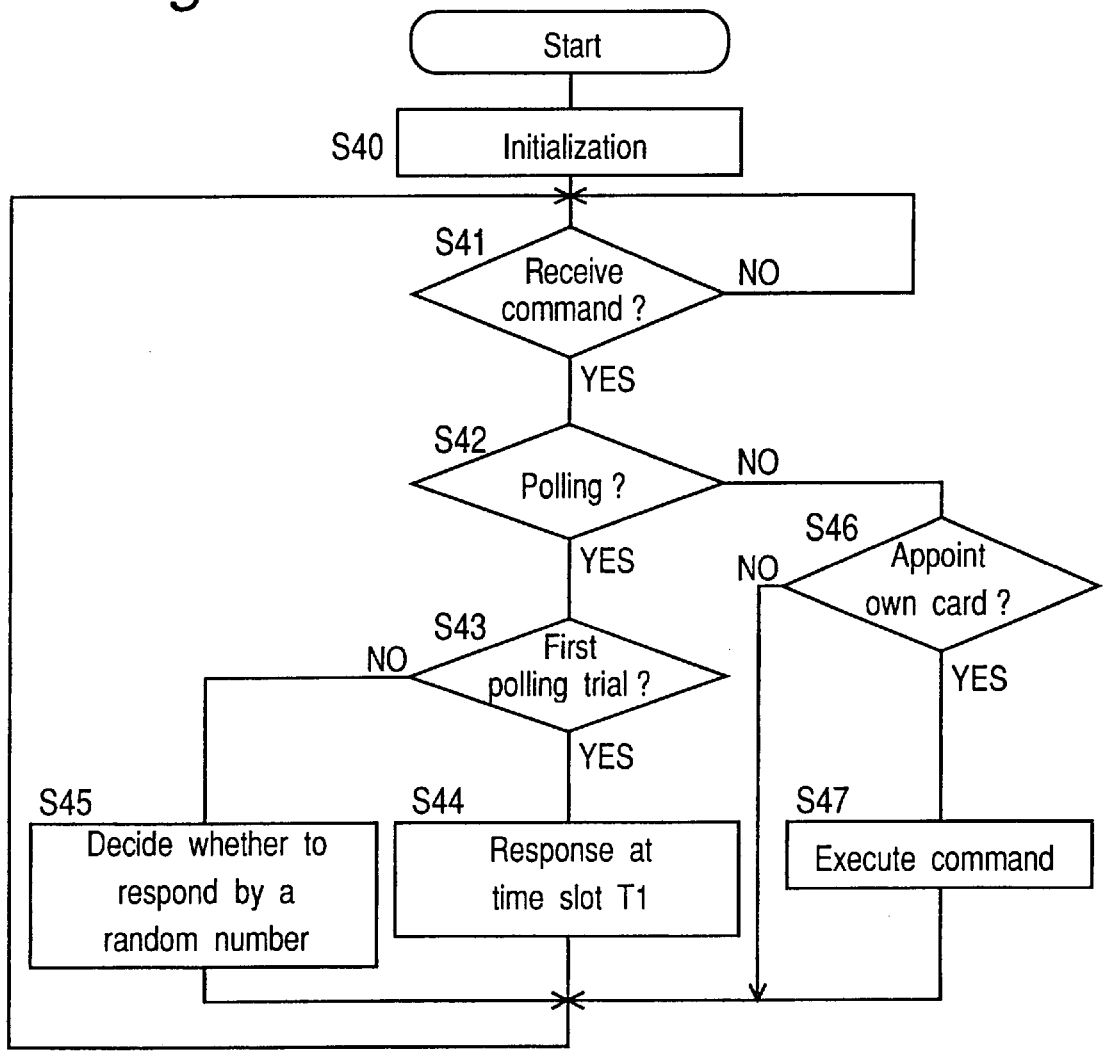
FIG. 12 is a flowchart of the communication processing steps executed by the non-contact IC card in accordance with the third preferred embodiment.

FIG. 12 is a flowchart of communication processing executed by the CPU (not illustrated) of non-contact IC card 261. The corresponding communication processing is also executed by the CPU (not illustrated) of non-contact IC card 361. First, the CPU initializes the trial number of polling and the like (step S40). Then the CPU waits for a command to be transmitted from reader/writer 120 (NO in step S41). If the CPU receives a command (YES in step S41) and if the command is a polling command (YES in step S42), then the CPU executes the following processing depending on the trail number.

If receiving a first polling trial (YES in step S43), then the CPU immediately outputs a response signal at the time slot T1 (step S44) and returns to step S41. If receiving a second or later polling trial (No in step S43), then the CPU decides whether to transmit a response signal or not, based on the value of one-bit data generated by the random-number generating circuit, and transmits a response signal following the decision (step S45). Then the CPU returns to step S41.

On the other hand, if the CPU receives a command demanding some processing other than polling (NO in step S42), and if the command appoints IC card 261 (YES in step S46), then the CPU executes the command processing such as the reading of the inherent information of IC card 261 (step S47) and returns to step S41. If the received command does not appoint IC card 261 (NO in step S46), then the CPU returns to step S41 to wait for another command.

Figure 13:
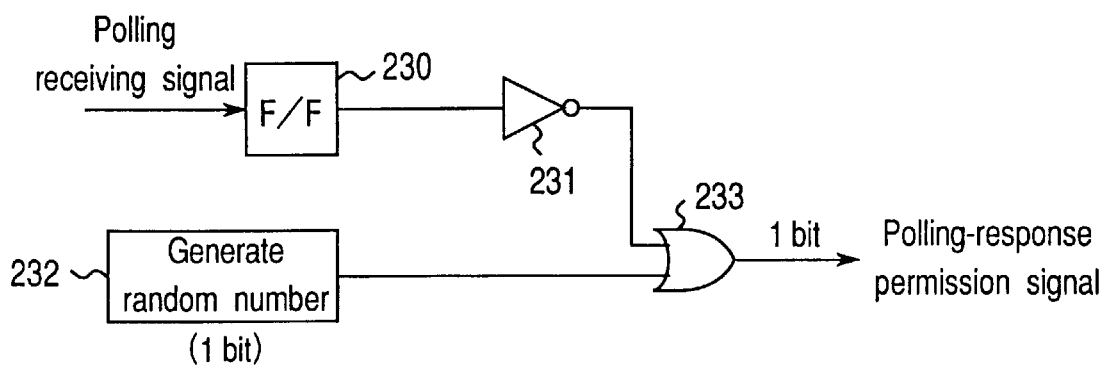
FIG. 13 is a block diagram illustrating some of the functions of the non-contact IC card implemented by hardware in accordance with the third preferred embodiment.

FIG. 13 is a block diagram illustrating the processing of the steps S44 and S45 in the flowchart of FIG. 12 implemented by hardware. A flip-flop 230 outputs an "L" signal during the reset time and outputs an "H" signal after receiving a first trial of. The signal output from flip-flop 230 is inverted by an inverter 231 and input to an OR gate 233. A one-bit random number output from a random-number generating circuit 232 (corresponding to the random-number generating circuit 207) is input to the other input terminal of OR gate 233. Therefore, OR gate 233 outputs an "H" signal as a polling-response permission signal until a first polling trial is received. OR gate 233 outputs, as the polling-response permission signal, the same signal as the one-bit signal output from random-number generating circuit 232, when a second or later polling trial is received. When the polling-response permission signal is at "H," the transmission of a response signal is permitted.

(5) Fourth Embodiment

A non-contact IC card 262 of the fourth embodiment is the one obtained by removing the random-number generating circuit 232 from a non-contact IC card 261 of the above third embodiment. The non-contact IC card 261 employed in the system of the third embodiment has decided whether to transmit a response signal or not, based on a one-bit random number generated by random-number generating circuit 232. In place of the random number, the non-contact IC card 262 (not illustrated) employed in the system of the fourth embodiment uses the CRC (cyclic redundancy check) signal accompanying the response signal transmitted to a reader/writer 130 in answering a first polling trial. In this case, as shown in FIG. 7, the value of the one bit used for deciding whether to transmit a response signal or not, depending on the retrial number of polling, is successively obtained from the first bit, second bit, third bit etc. from the lowest bit of the CRC signal.

By effectively using the CRC signal in this way, the random-number generating circuit 232 used in the non-contact IC card 261 employed in the system of the third embodiment can be removed, so that the construction is simplified.

The construction and operation of a reader/writer 130 that recognizes non-contact IC card 262 employed in the system of the fourth embodiment are the same as those of the reader/writer 120 employed in the system of the third embodiment, so that their description is omitted from here.

Figure 14:
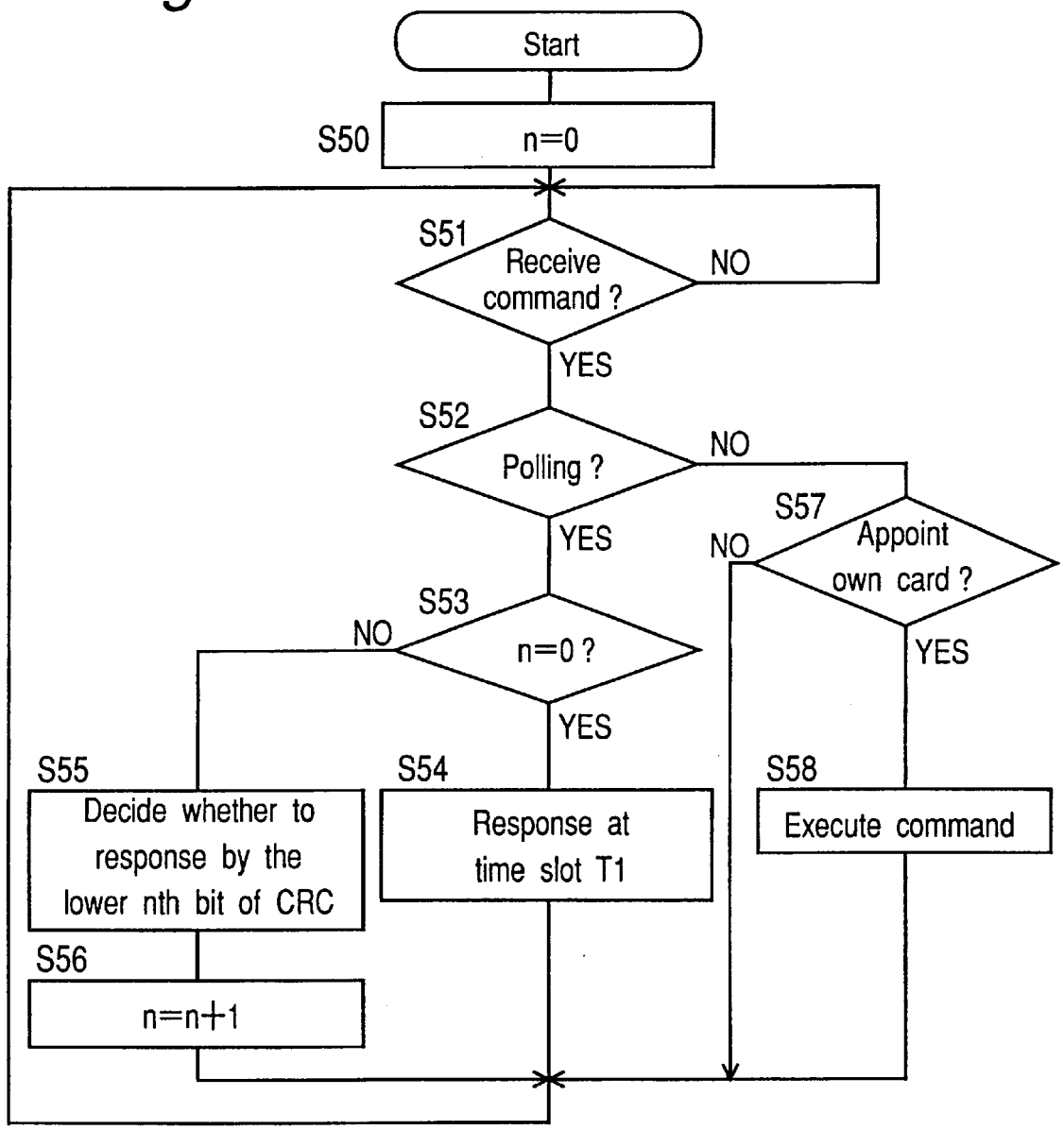
FIG. 14 is a flowchart of communication processing executed by a non-contact IC card in accordance with a fourth preferred embodiment of the present invention.

FIG. 14 is a flowchart of communication processing executed by the CPU (not illustrated) of non-contact IC card 262 that uses the CRC signal in place of random-number generating circuit 232. First, the CPU sets the value of a variable n that expresses the trial number of polling at 0 (step S50). Then the CPU waits for a command to be transmitted from reader/writer 130 (NO in step S51). If the CPU receives a command (YES in step S51) and if the command is a polling command (YES in step S52), then the CPU executes the following processing.

If the value of the variable n is 0 (YES in step S53), then the CPU judges that it has received a first polling trial. In this case, the CPU transmits a response signal at the time slot T1 (step S54) and returns to step S51.

If the value of the variable n is more than 0 (NO in step S53), then the CPU judges that it has received a second or later polling trial. In this case, the CPU decides whether to transmit a response signal or not, based on the nth bit of the lowest bit of the CRC signal accompanying the response signal for the first polling trial, and follows the decision (step S55). Then the CPU increments the variable n by 1 (step S56) and returns to step S51.

On the other hand, if the CPU receives a command demanding some processing other than polling (NO in step S52), and if the command appoints IC card 262 (YES in step S57), then the CPU executes the command processing (step S58) and returns to step S51. If the received command does not appoint IC card 262 (NO in step S57), then the CPU returns to step S51.

Figure 15:
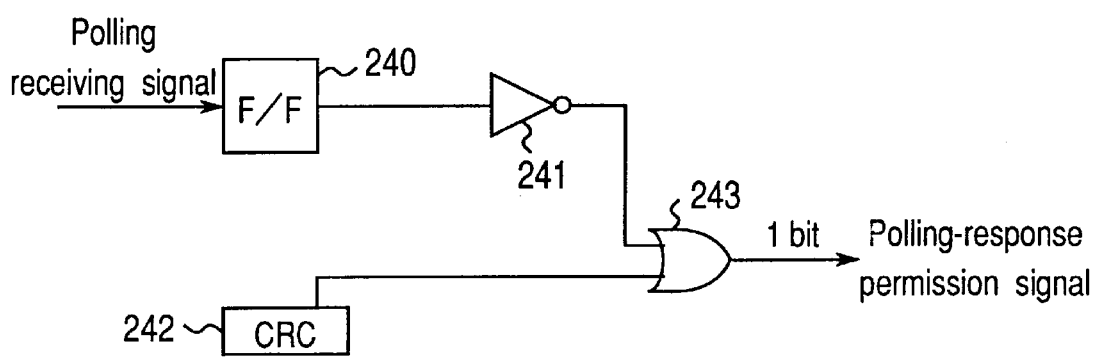
FIG. 15 is a block diagram illustrating some of the functions of the non-contact IC card implemented by hardware in accordance with the four th preferred embodiment.
Figure 16:
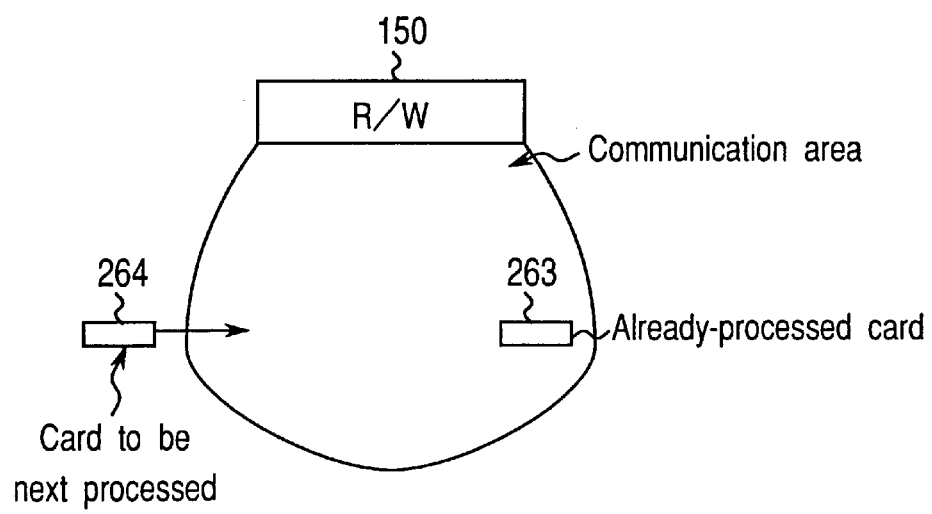
FIG. 16 is a schematic diagram illustrating a state in which a non-contact IC card that is the next card to be processed has entered a reader/writer's communication area of the reader/writer when another non-contact IC card that has been already processed remains in the communication area in accordance with a fifth preferred embodiment of the present invention.

FIG. 15 is a block diagram illustrating the processing of the steps S53, S54, and S55 in the flowchart of FIG. 14 implemented by hardware. A flip-flop 240 outputs an "L" signal during the reset time and outputs an "H" signal after receiving a first polling trial. The signal output from flip-flop 240 is inverted by an inverter 241 and input to an OR gate 243. The predetermined one-bit number output from a CRC signal output circuit 242 is input to the other input terminal of OR gate 243. Here, CRC signal output circuit 242 outputs the one-bit data of the CRC signal selected by the CPU.

Therefore, OR gate 243 outputs an "H" signal as a polling-response permission signal until a first polling trial is received. OR gate 243 outputs, as the polling-response permission signal, the same signal as the one-bit signal output from CRC signal output circuit 242, when a second or later polling trial is received. When the polling-response permission signal is at "H," the transmission of a response signal is permitted.

As described above, the non-contact IC card 262 of the fourth embodiment implements a similar operation as in the third embodiment without using a random-number generating circuit. By this means, the construction of a non-contact IC card is simplified, and costs are cut down.

(6) Fifth Embodiment

A reader/writer 150 and non-contact IC cards 263, 264 employed in the recognition system for non-contact IC cards of the fifth embodiment are aimed at effectively preventing the collision of commands, in the case where unprocessed card 264 enters the communication area of reader/writer 150, when already-processed card 263 still exists in the communication area. In the present fifth embodiment, the already-processed card 263 does not transmit a response signal in answering a polling trial.

In the recognition system for non-contact IC cards of the fifth embodiment, the construction and operation of reader/writer 150 can be any one of the already-described reader/writers of the first to fourth embodiments. Therefore, their description is omitted from here.

Figure 17:
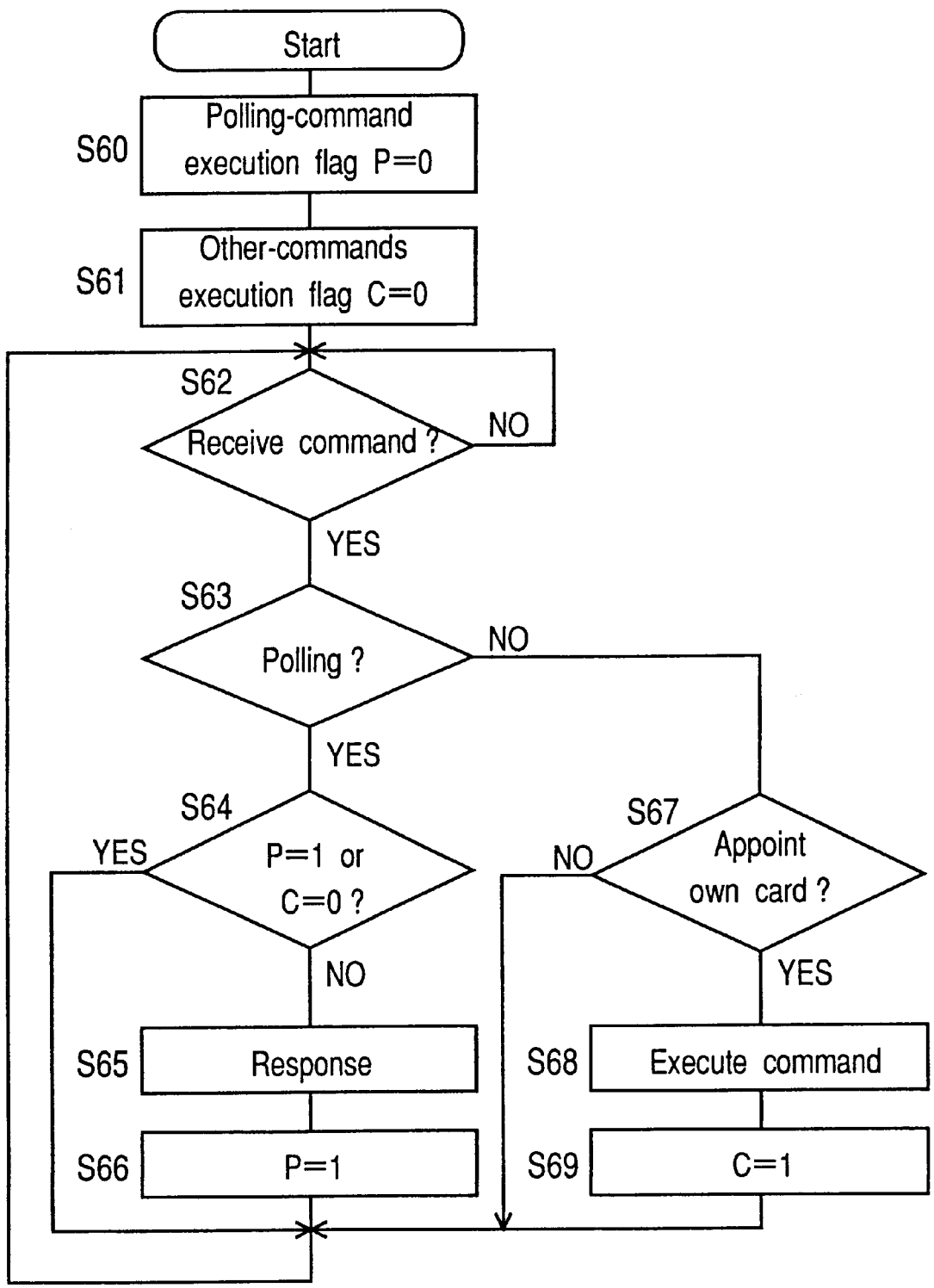
FIG. 17 is a flowchart of communication processing executed by a non-contact IC card in accordance with the fifth preferred embodiment.

FIG. 17 is a flowchart of communication processing executed by the CPU (not illustrated) of non-contact IC card 263. The corresponding communication processing is also executed by the CPU (not illustrated) of non-contact IC card 264. First, the CPU sets a polling-command execution flag P at 0 (step S60), sets an othercommands execution flag C at 0 (step S61), and waits for a command to be transmitted from reader/writer 150 (NO in step S62). If the CPU receives a command (YES in step S62) from reader/writer 150 and if the command is a polling command (YES in step S63), then the CPU executes the following processing.

If at least one of the polling-command execution flag P and the other-commands execution flag C is not at 1 (NO in step S64), then the CPU outputs a response signal (step S65), sets the polling-command execution flag at 1 (step S66), and returns to step S62. If both the polling-command execution flag P and the other commands execution flag C are at 1 (YES in step S64), then the CPU does not transmit a response signal (step S69) and returns to step S62 without transmitting a response signal.

On the other hand, if the CPU receives a command demanding some processing other than polling (NO in step S63), and if the command appoints IC card 263 (YES in step S67), then the CPU executes the command processing (step S68), sets the other-commands execution flag C at 1 (step S69), and returns to step S62. If the received command does not appoint IC card 263 (NO in step S67), then the CPU returns to step S62.

As described above, after having transmitted a response signal in answering a polling trial, non-contact IC card 263 next answers a command processing demand. In this way, if the already-processed non-contact IC card 263 remains in the communication area of reader/writer 150, collision of response signals that occurs when the unprocessed non-contact IC card 264 enters the communication area can be effectively avoided.

Figure 18:
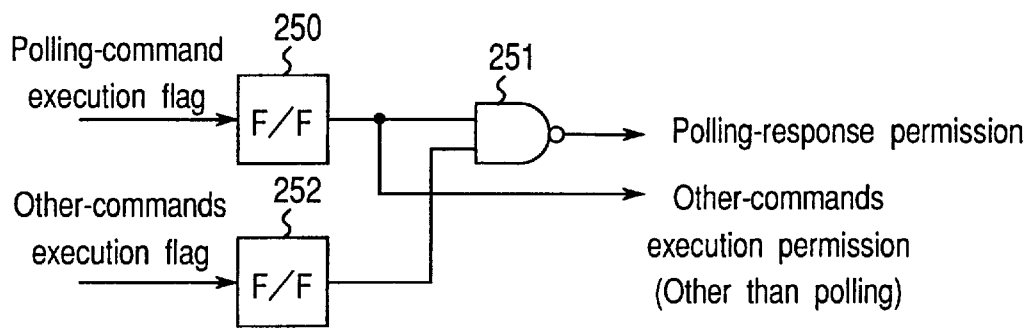
FIG. 18 is a block diagram illustrating a part of the functions of a non-contact IC card implemented by hardware in accordance with the fifth preferred embodiment.

FIG. 18 is a block diagram illustrating the processing of the steps S64, S65, and S66 in the flowchart of FIG. 17 implemented by hardware. The value of the polling-command execution flag P is input to a flip-flop 250. As described above, the polling-command execution flag P is set at 1, when a response signal is transmitted in answering a polling trial. The output of flip-flop 250 is input to a NAND gate 251 and also output as an other-commands execution permission signal. The value of the other commands-execution flag C is input to a flip-flop 252. The other-commands execution flag c is set at 1, after non-contact IC card 263 is appointed by reader/writer 150 and predetermined processing is executed. The output of flip-flop 252 is input to the other input terminal of NAND gate 251. Therefore, NAND gate 251 outputs an "H" signal that permits the transmission of a response signal except, as the polling-response permission signal, when the signals input from the two flip-flops are both at "H."

(7) Sixth Embodiment

The system of the above fifth embodiment is not concerned with the case where a plurality of unprocessed IC cards coexist in the communication area of reader/writer 150. Therefore, that system has the problem that the collision of response signals occurs if more than one unprocessed IC card simultaneously enters the communication area of reader/writer 150.

The recognition system for non-contact IC cards of the sixth embodiment solves the above problem by employing a non-contact IC card that has additionally a function that makes the IC card not transmit a response signal after the IC card has already transmitted a response signal in answering a polling trial by a reader/writer 160 and has executed predetermined processing.

Figure 19:
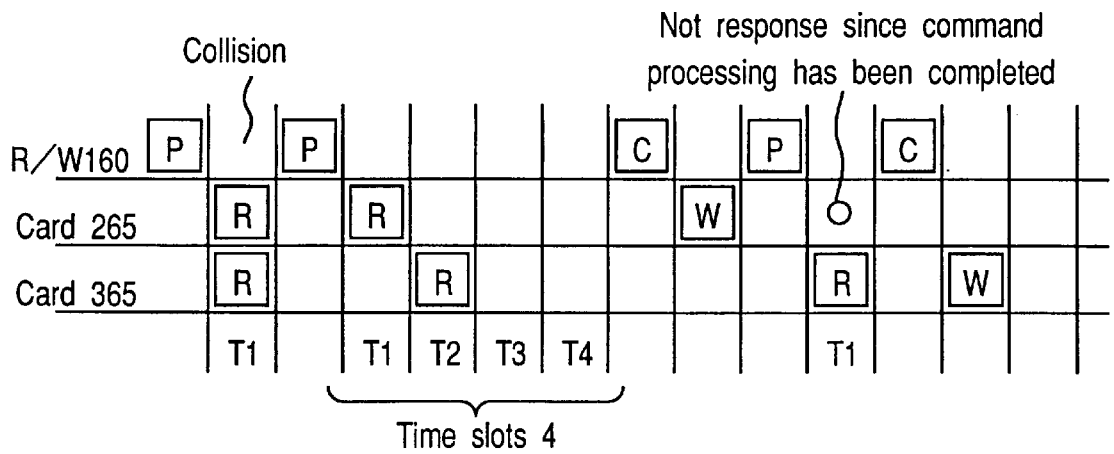
FIG. 19 is a timing chart illustrating communication between a reader/writer and a non-contact IC card in a recognition system for non-contact IC cards in accordance with a sixth preferred embodiment of the present invention.

FIG. 19 is a timing chart illustrating communication between reader/writer 160 and non-contact IC cards 265, 365 in the case where non-contact IC cards 265 and 365 coexist in the communication area of reader/writer 160. The constructions of non-contact IC cards 265 and 365 are the same. Their inherent information is basically of the same kind but different from each other.

After outputting a polling signal P, reader/writer 160 waits for a response signal to be transmitted from a non-contact IC card at the first time slot T1. Non-contact IC cards 265 and 365 that have received the polling signal from reader/writer 160 respectively immediately output a response signal R. In this case, the response signals from the two cards collide to cause a failure in receiving in reader/writer 160. Therefore, reader/writer 160 outputs a polling signal again and sets four time-slots to wait for a response signal to be transmitted from a non-contact IC card.

Non-contact IC card 265 outputs a response signal at a time slot identified by a 2-bit random number generated by a random-number generating circuit (not illustrated, equivalent to random-number generating circuit 207 of FIG. 2) installed therein. Non-contact IC card 365 outputs a response signal at a time slot identified by a 2-bit random number generated by random-number generating circuit 307 (not illustrated) installed therein. In the present example shown in FIG. 19, non-contact IC card 265 outputs a response signal at the time slot T1, and non-contact IC card 365 outputs a response signal at the time slot T4.

Thereafter, reader/writer 160 appoints the non-contact IC card 265 that has first transmitted a response signal, to demand predetermined command processing (indicated by C in the figure), such as the processing of receiving the inherent information. In answering this demand, non-contact IC card 265 executes the demanded processing (indicated by W in the figure).

Reader/writer 160 then resets the trial number of polling and performs a first polling trial. In answering this polling trial, the already-processed non-contact IC card 265 does not transmit a response signal, and only the unprocessed non-contact IC card 365 transmits a response signal. Reader/writer 180 appoints the IC card 365 that has transmitted a response signal, to demand predetermined command processing, such as the processing of receiving the inherent information. Non-contact IC card 365 then executes the demanded processing.

The construction and operation of the reader/writer 160 in the system of the sixth embodiment are the same as those of the reader/writer 100 employed in the system of the first embodiment (See FIGS. 2 and 4), so that their description is omitted from here.

Figure 20:
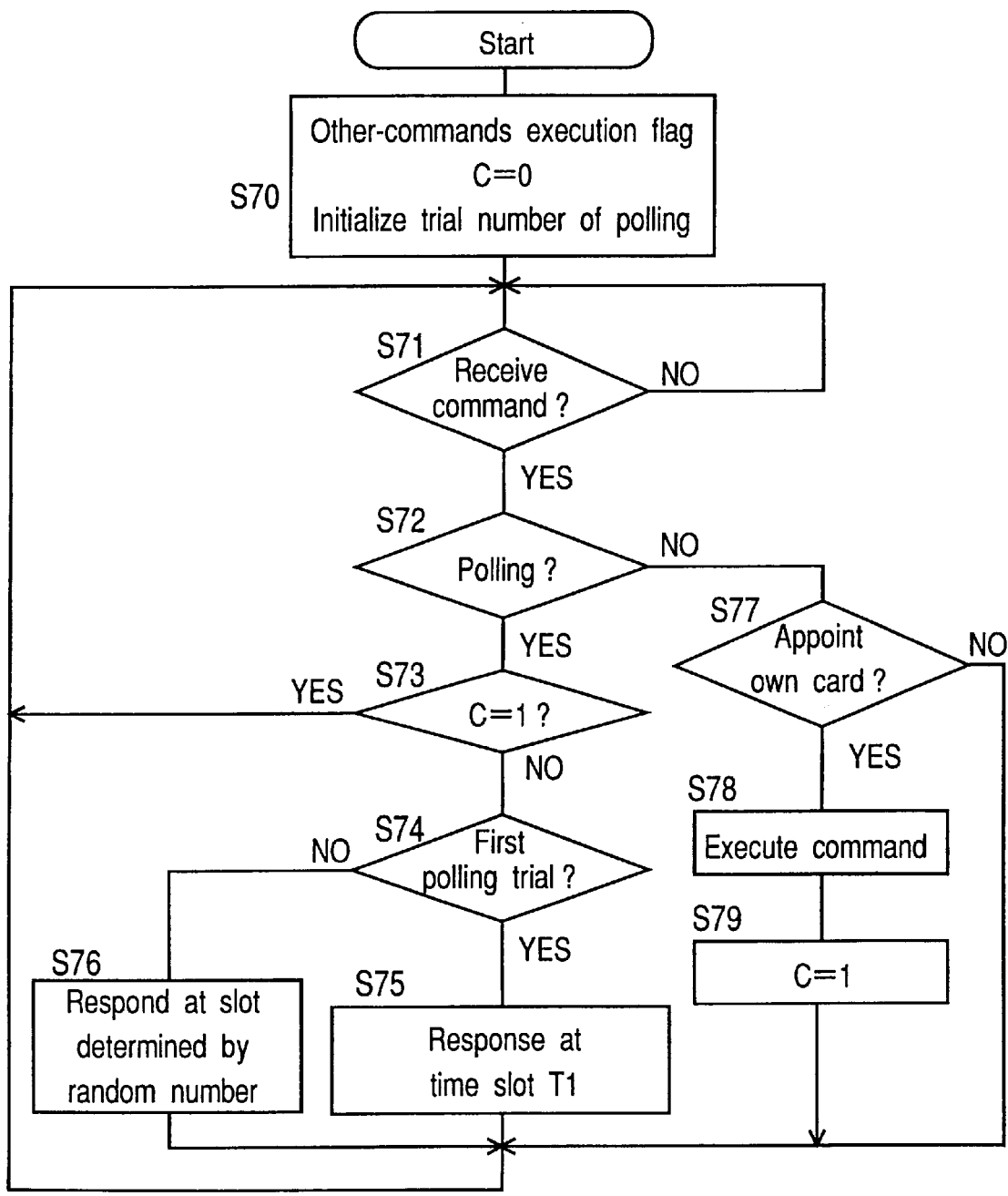
FIG. 20 is a flowchart of communication processing executed by a non-contact IC card in accordance with the sixth preferred embodiment.

FIG. 20 is a flowchart of communication processing executed by the CPU (not illustrated) of non-contact IC card 265. First, the CPU sets an other-commands execution flag C at 0 and initializes variables such as the trial number of polling (step S70). The CPU then waits for a command to be transmitted from reader/writer 160 (NO in step S71). If the CPU receives a command from reader/writer 160 (YES in step S71) and if the command is a polling command (YES in step S72), then the CPU executes the following processing, depending on the value C of the other-commands execution flag and the trial number of polling.

If the value C of the other-commands execution flag is 0, that is, individual command processing has not been executed (NO in step S73), and if the CPU receives a first polling trial (YES in step S74), then the CPU immediately outputs a response signal at the time slot T1 (step S75). If the CPU receives a second or later polling trial (NO in step S74), then the CPU outputs a response signal at a time slot determined by a random number generated by the random-number generating circuit (step S76).

If the value C of the other-commands execution flag is 1, that is, individual command processing has been already executed (YES in step S73), then the CPU does not transmit a response signal for the polling command and returns to step S71.

On the other hand, if the CPU receives a command demanding some processing other than polling (NO in step S72), and if the command appoints IC card 265 (YES in step S77), then the CPU executes the command processing (step S78), such as the reading of the inherent information, sets the other-commands execution flag C at 1 (step S79), and returns to step S71. If the received command does not appoint IC card 265 (NO in step S77), then the CPU returns to step S71.

(8) Seventh Embodiment

A non-contact IC card 266 employed in the recognition system for non-contact IC cards of the seventh embodiment is obtained by removing the random-number generating circuit from the non-contact IC card 265 of the above sixth embodiment. The non-contact IC card 265 employed in the system of the sixth embodiment has identified the time slot at which a response signal is transmitted in answering a second or later polling trial, based on a 2-bit random number generated by the random-number generating circuit. In place of the random number, the non-contact IC card 266 (not illustrated) employed in the system of the seventh embodiment uses the CRC signal accompanying the response signal transmitted to a reader/writer 170 in answering a first polling trial. In this case, the value of the 2 bits used for identifying a time slot depending on the retrial number of polling is successively obtained from the first and second bits, the second and third bits, the third and fourth bits etc., from the lowest bit of the CRC signal.

By effectively using the CRC signal in this way, the random-number generating circuit used in the non-contact IC card 265 employed in the system of the sixth embodiment can be removed, so that the construction is simplified.

Further, as the above sixth embodiment, the non-contact IC card 266 employed in the system of the seventh embodiment does not transmit a response signal, after the IC card has already transmitted a response signal in answering a polling trial by a reader/writer 170 and executed predetermined processing. In this way, the collision of response signals is more securely avoided, in the case where a plurality of non-contact IC cards coexist in the communication area of reader/writer 170.

Figure 21:
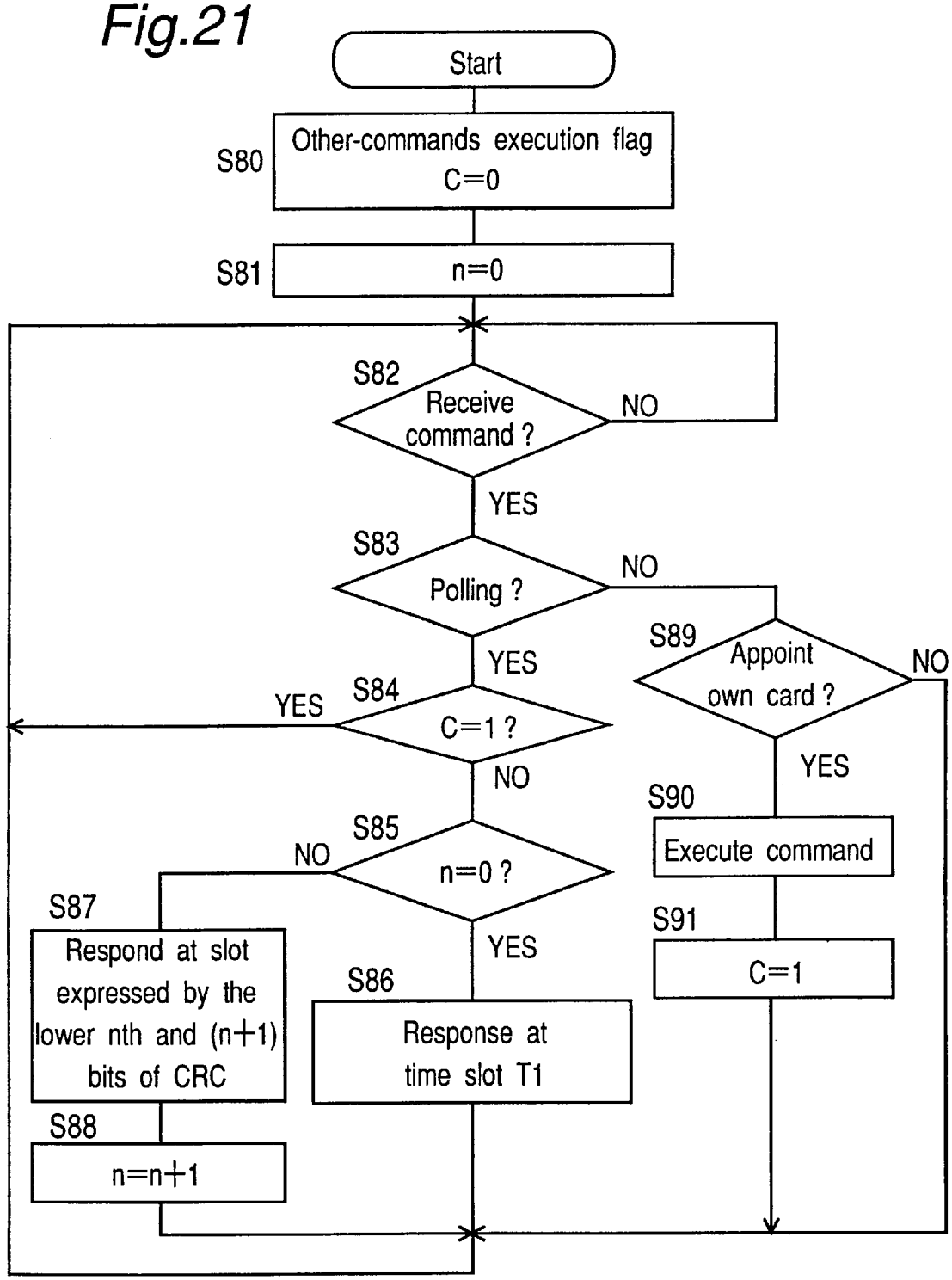
FIG. 21 is a flowchart of communication processing executed by a non-contact IC card in accordance with a seventh preferred embodiment of the present invention.

FIG. 21 is a flowchart of communication processing executed by the CPU (not illustrated) of non-contact IC card 266 that uses the CRC signal in place of a random-number generating circuit. First, the CPU sets the other-commands execution flag C at 0 (step S80), sets the variable n that expresses the trial number of polling at 0 (step S81), and wait for a command transmitted from reader/writer 170 (NO in step S82). If the CPU receives a command from reader/writer 170 (YES in step S82) and if the command is a polling command (YES in step S83), then the CPU executes the following processing.

If the value C of the other-commands execution flag is 0, that is, the assigned command processing has not been executed (NO in step S84), and if the value of the variable n is 0 (YES in step S85), then the CPU judges that it has received a first polling trial. In this case, the CPU transmits a response signal at the time slot T1 (step S86) and returns to step S82.

If the value of the variable n is more than 0 (NO in step S85), then the CPU judges that it has received a second or later polling trial. In this case, the CPU outputs a response signal at a time slot identified by the nth and (n+1)th bits from the lowest bit of the CRC signal accompanying the response signal for the first polling trial (step S87). Then the CPU increments the variable n by 1 (step S88) and returns to step S82.

If the value C of the other-commands execution flag is 1, that is, the assigned command processing has been already executed (YES in step S84), then the CPU does not transmit a response signal for the polling command and returns to step S82.

On the other hand, if the CPU receives a command demanding some processing other than polling (NO in step S83), and if the command appoints IC card 266 (YES in step S89), then the CPU executes the command processing (step S90), sets the other-commands execution flag C at 1 (step S91), and returns to step S82. If the received command does not appoint IC card 266 (NO in step S89), then the CPU returns to step S82.

(8) Eighth Embodiment

A non-contact IC card 267 employed in the recognition system for non-contact IC cards of the eighth embodiment immediately transmits a response signal in answering a first polling trial by a reader/writer 180. Non-contact IC card 261 decides whether to transmit a response signal in answering a second or later polling trial, based on the lowest one bit of a random number generated by a random-number generating circuit and transmits a response signal following the decision. Further, after executing assigned command processing, non-contact IC card 267 does not transmit a response signal in answering a polling trial by reader/writer 180.

The reader/writer 180 employed in the system of the eighth embodiment, after performing polling, always waits for a response signal from a non-contact IC card at the time slot T1.

The constructions of reader/writer 180 and non-contact IC card 267 are the same as those of the reader/writer 100 and non-contact IC card 200 employed in the system of the first embodiment shown in FIG. 2.

Figure 22:
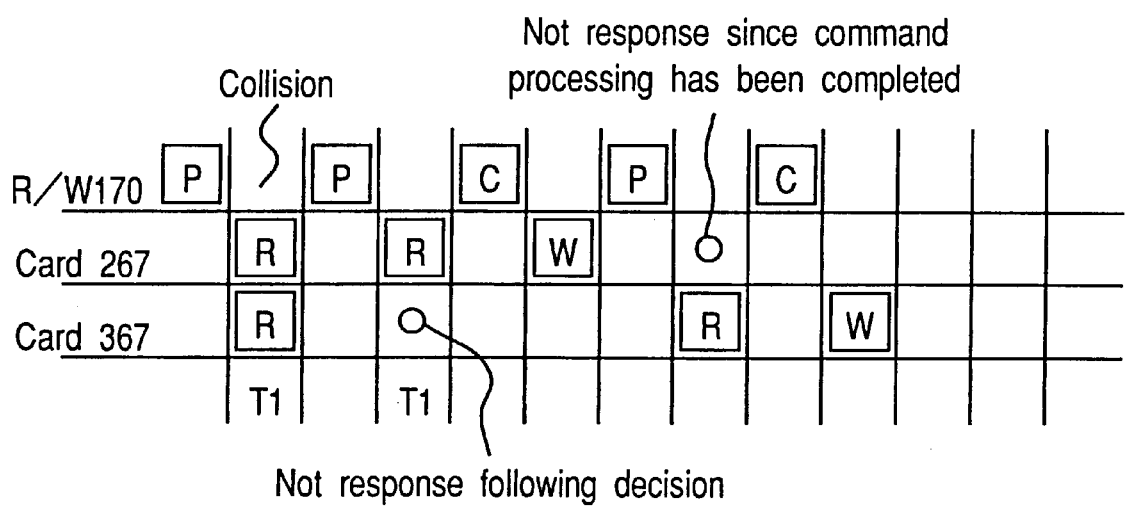
FIG. 22 is a timing chart illustrating communication between a reader/writer and a non-contact IC card in a recognition system for non-contact IC cards in accordance with an eighth preferred embodiment of the present invention.

FIG. 22 is a timing chart illustrating communication between reader/writer 180 and non-contact IC cards 267, 367 in the case where non-contact IC cards 267 and 367 coexist in the communication area of reader/writer 180. The constrictions of non-contact IC card 267 and 367 are the same. Their inherent information is basically of the same kind but different from each other.

After outputting a polling signal P. reader/writer 180 waits for a response signal to be transmitted from a non-contact IC card at the time slot T1. Non-contact IC cards 267 and 367 that have received the polling signal from reader/writer 180 respectively immediately outputs a response signal R. In this case, the response signals from the two cards collide to cause a failure in receiving in reader/writer 180. Therefore, reader/writer 180 outputs a polling signal again to wait for a response signal to be transmitted from a non-contact IC card at the time slot T1.

Non-contact IC card 267 decides whether to transmit a response signal, based on a one-bit value of a random number generated by the random-number generating circuit (not illustrated; see random-number generating circuit 207 in FIG. 2) installed therein, and transmits a response signal following the decision. Non-contact IC card 367 decides whether to transmit a response signal, based on a one-bit value of a random number generated by the random-number generating circuit (not illustrated; see random-number generating circuit 207 in FIG. 2) installed therein, and transmits a response signal following the decision. In the present example shown in FIG. 22, non-contact IC card 267 transmits a response signal at the time slot T1, and non-contact IC card 367 does not transmit a response signal at the time slot T1.

Thereafter, reader/writer 180 appoints the non-contact IC card 267 that has transmitted a response signal, to demand predetermined command processing, such as the processing of receiving the inherent information (indicated by C in the figure). In answering this demand, non-contact IC card 267 executes the demanded processing (indicated by W in the figure).

Reader/writer 180 then resets the trial number of polling and performs a first polling trial. In answering this polling trial, the already-processed non-contact IC card 267 does not transmit a response signal, and only the unprocessed non-contact IC card 367 transmits a response signal. Reader/writer 180 appoints the IC card 367 that has transmitted a response signal, to demand predetermined command processing, such as the processing of receiving the inherent information. Non-contact IC card 367 then executes the demanded processing.

The construction and operation of the reader/writer 180 in the system of the eighth embodiment are the same as those of the reader/writer 120 employed in the system of the third embodiment, so that their description is omitted from here.

Figure 23:
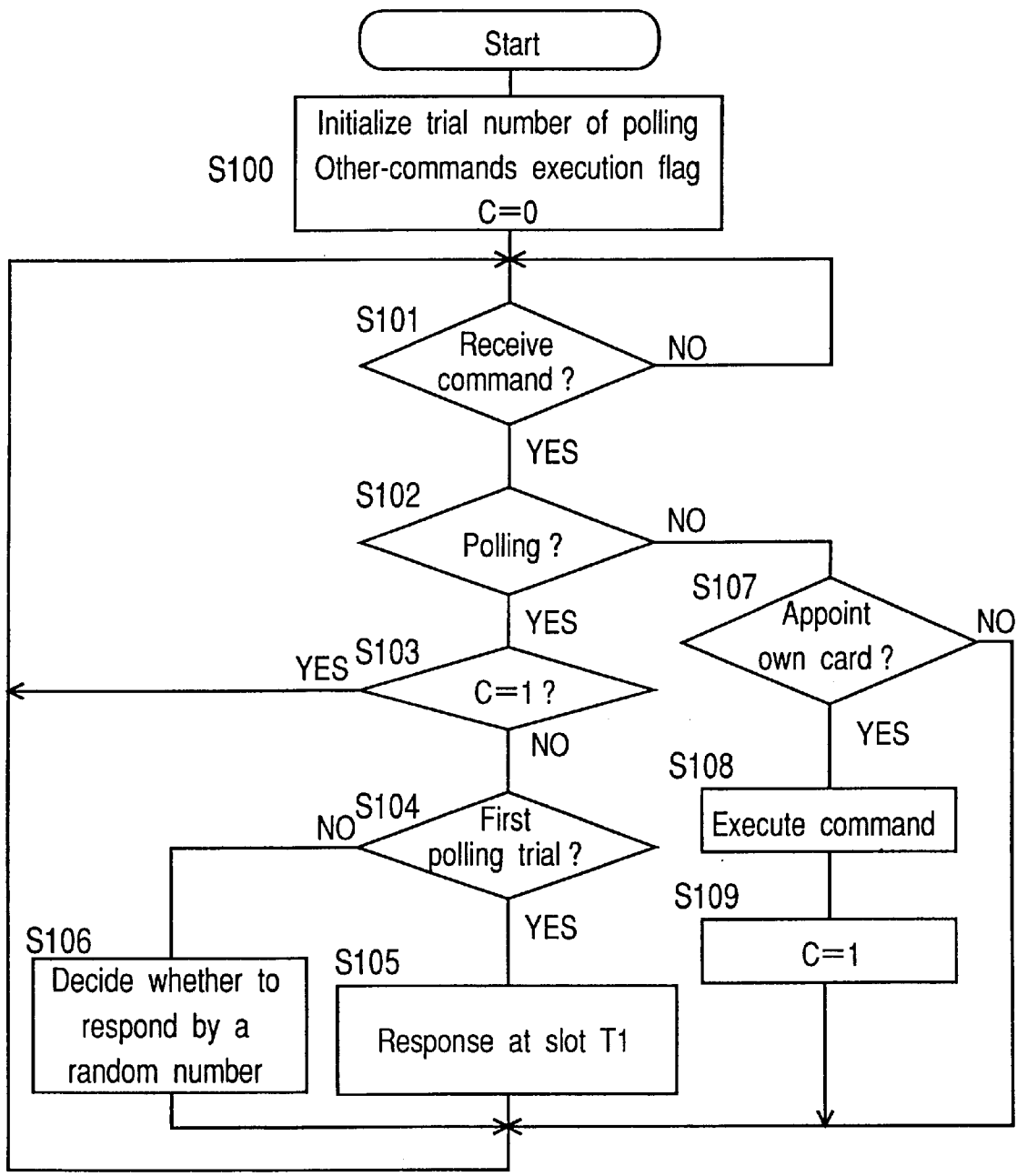
FIG. 23 is a flowchart of communication processing executed by a non-contact IC card in accordance with the eighth preferred embodiment.

FIG. 23 is a flowchart of communication processing executed by the CPU (not illustrated) of non-contact IC card 267. First, the CPU sets an other-commands execution flag C at 0 and sets the trial number of polling at 0 (step S100). The CPU then waits for a command to be transmitted from reader/writer 180 (NO in step S101). If the CPU receives a command (YES in step S101) and if the command is a polling command (YES in step S102), then the CPU executes the following processing.

If the value C of the other-commands execution flag is 0, that is, individual command processing has not been executed (NO in step S103), and if the CPU receives a first polling trial (YES in step S104), then the CPU immediately outputs a response signal at the time slot T1 (step S105) and returns to step S101. If the CPU receives a second or later polling trial (NO in step S74), then the CPU decides whether to transmit a response signal or not, based on a one-bit random-number generated by a random-number generating circuit, transmits a response signal following the decision (step S106), and returns to step S101.

If the value C of the other-commands execution flag is 1, that is, individual command processing has been already executed (YES in step S103), then the CPU does not transmit a response signal for the polling command and returns to step S101.

On the other hand, if the CPU receives a command demanding some processing other than polling (NO in step S102), and if the command appoints IC card 267 (YES in step S107), then the CPU executes the command processing (step S108), sets the other-commands execution flag C at 1 (step S109), and returns to step S101. If the received command does not appoint IC card 267 (NO in step S107), then the CPU returns to step S101.

(9) Ninth Embodiment

A non-contact IC card 268 employed in the recognition system for non-contact IC cards of the ninth embodiment is obtained by removing the random-number generating circuit from the non-contact IC card 267 of the above eight embodiment. The non-contact IC card 267 employed in the system of the eighth embodiment has decided whether to transmit a response signal or not, in answering a second or later polling trial, based on a one-bit random number generated by the random-number generating circuit.

In place of the random number, the non-contact IC card 268 (not illustrated) employed in the system of the eighth embodiment uses the CRC signal accompanying the response signal transmitted to a reader/writer 190 in answering a first polling trial. In this case, the value of the 1 bit used for deciding whether to transmit a response signal or not, depending on the trial number of polling, is successively obtained from the first bit, second bit, third bit, etc. from the lowest bit of the CRC signal.

By effectively using the CRC signal in this way, the random-number generating circuit used in the non-contact IC card 267 employed in the system of the eighth embodiment can be removed, so that the construction is simplified.

Further, as the above eight embodiment, the non-contact IC card 268 employed in the system of the ninth embodiment does not transmit a response signal, after the IC card has already transmitted a response signal in answering a polling trial by a reader/writer 190 and executed assigned command processing. In this way, the collision of response signals is more securely avoided, in the case where a plurality of non-contact IC cards coexist in the communication area of reader/writer 190.

Figure 24:
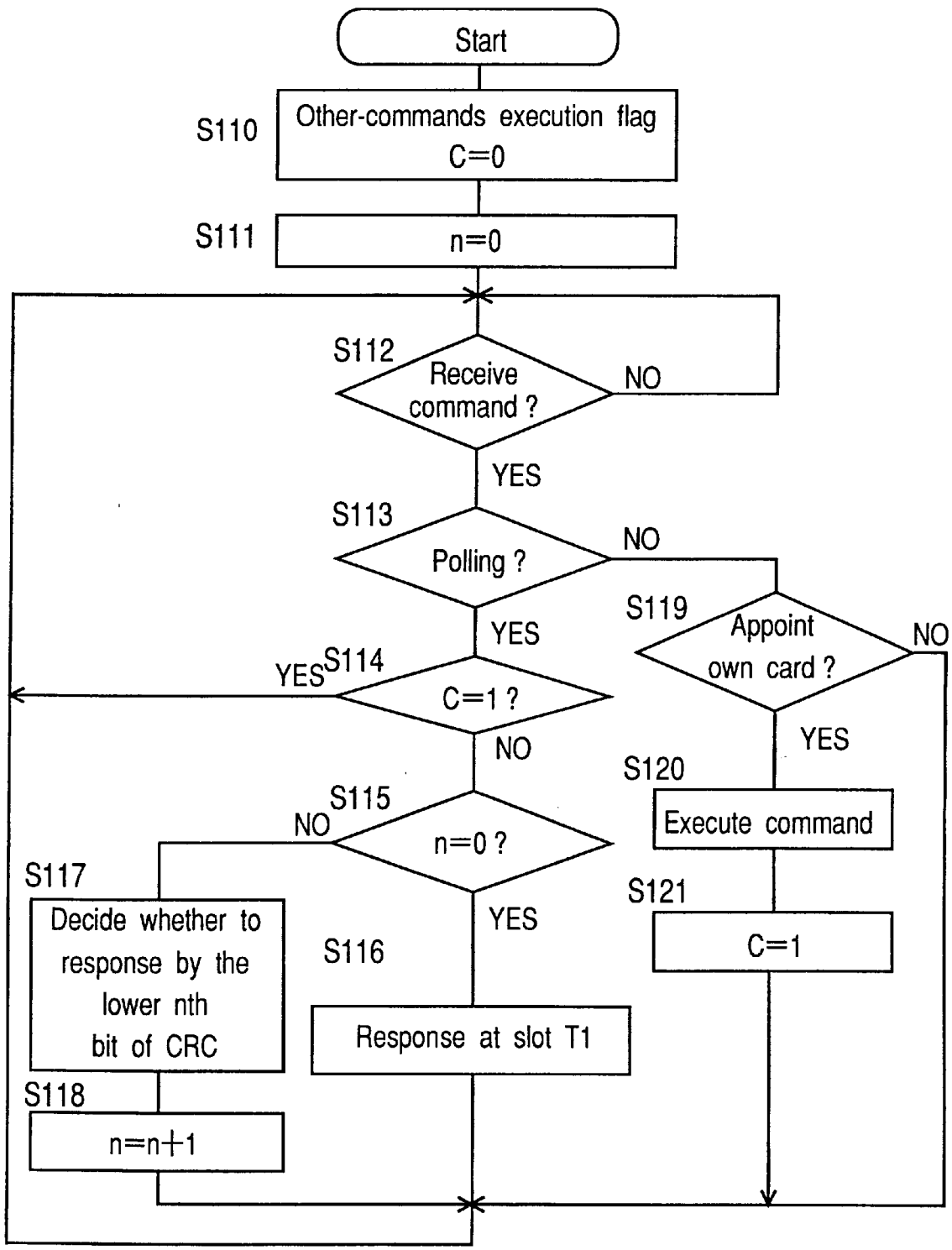
FIG. 24 is a flowchart of communication processing executed by a non-contact IC card in accordance with a ninth preferred embodiment of the present invention.

FIG. 24 is a flowchart of communication processing executed by the CPU (not illustrated) of non-contact IC card 268 that uses the CRC signal in place of a random-number generating circuit. First, the CPU sets the other-commands execution flag C at 0 (step S110), sets the variable n that expresses the trial number of polling at 0 (step S111), and waits for a command to be transmitted from reader/writer 190 (NO in step S112). If the CPU receives a command (YES in step S112) and if the command is a polling command (YES in step S113), then the CPU executes the following processing.

If the value C of the other-commands execution flag is 0, that is, the assigned command processing has not been executed (NO in step S114), and if the value of the variable n is 0 (YES in step S115), then the CPU judges that it has received a first polling trial. In this case, the CPU transmits a response signal at the time slot T1 (step S116) and returns to step S112.

If the value of the variable n is more than 0 (NO in step S115), then the CPU judges that it has received a second or later polling trial. In this case, the CPU decides whether to transmit a response signal or not, based on the nth bit from the lowest bit of the CRC signal accompanying the response signal transmitted for the first polling trial, and transmits a response signal, following the decision (step S117). Then the CPU increments the variable n by 1 (step S118) and returns to step S112.

If the value C of the other-commands execution flag is 1, that is, the assigned command processing has been already executed (YES in step S114), then the CPU does not transmit a response signal for the polling command and returns to step S112.

On the other hand, if the CPU receives a command demanding some processing other than polling (NO in step S113), and if the command appoints IC card 268 (YES in step S119), then the CPU executes the command processing (step S120), sets the other-commands execution flag C at 1 (step S121), and returns to step S112. If the received command does not appoint IC card 268 (NO in step S119), then the CPU returns to step S112.

The present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A recognition system for non-contact IC cards comprising a plurality of non-contact IC cards and a reader/writer that recognizes said non-contact IC cards, each of said non-contact IC cards having a first response signal transmitting means for immediately transmitting a first response signal to a predetermined time slot in response to a first polling trial by said reader/writer and a second response signal transmitting means for transmitting a second response signal to a time slot randomly selected from a predetermined number of succeeding time slots, in response to a subsequent polling trial by said reader/writer and said reader/writer having a polling means for receiving the first response signal from each of said non-contact IC cards at the predetermined time slot during the execution of the first polling trial and receiving respective second response signals from said non-contact IC cards at the predetermined number of succeeding time slots during the execution of the subsequent polling trial.

2. The recognition system for non-contact IC cards as defined in claim 1, wherein said second response signal transmitting means has a random-number generating circuit for generating a random number, said second response signal transmitting means selecting arbitrary one of the predetermined number of the succeeding time slots based on the random-number generated by said random-number generating circuit and then transmitting the second response signal to the randomly selected time slot.

3. The recognition system for non-contact IC cards as defined in claim 1, wherein said second response signal transmitting means utilizes a CRC signal accompanied with the first response signal transmitted by said first response signal transmitting means as randomly arranged bit-data, selects a time slot among the predetermined number of succeeding time slots, based on said bit-data at different bit places depending on the number of the polling trial, and transmits the second response signal to the selected time slot.

4. The recognition system of non-contact IC cards as defined in claim 1, wherein each of said non-contact IC cards has a response prohibition means for prohibiting transmission of a response signal to said reader/writer once it has been appointed by said reader/writer and executed a predetermined command processing.

5. A recognition system for non-contact IC cards comprising a plurality of non-contact IC cards and a reader/writer that recognizes said non-contact IC cards, each of said non-contact IC cards having a first response signal transmitting means for immediately transmitting a first response signal to a predetermined time slot in response to a first polling trial from said reader/writer, a second response signal transmitting means for determining whether or not to transmit a second response signal, based on random bit data, and transmitting the second response signal in response to a subsequent polling trial, if determined to transmit, and said reader/writer having a polling means for receiving respective second response signals from said non-contact IC cards at a predetermined number of succeeding time slots after the first polling trial.

6. The recognition system for non-contact IC cards as defined in claim 5, wherein said second response signal transmitting means has a random-number generating circuit for generating a random number, said second response signal transmitting means determining whether or not to transmit the second response signal based on the random number generated by said random-number generating circuit and transmitting the second response signal if determined to transmit.

7. The recognition system for non-contact IC cards as defined in claim 5, wherein said second response signal transmitting means utilizes a CRC signal accompanied with the first response signal transmitted by said first response signal transmitting means as randomly arranged bit-data, determines whether or not to transmit the second response signal based on said randomly arranged bit-data at different bit places depending on the number of polling trials and transmits the second response signal if determined to transmit.

8. The recognition system of non-contact IC cards as defined in claim 5, wherein each non-contact IC card has a response prohibiting means for prohibiting transmission of a response signal to said reader/writer once it has been appointed by said reader/writer and executed a predetermined command processing.

9. A recognition method for non-contact IC cards being employed in a recognition system comprising a plurality of non-contact IC cards and a reader/writer that recognizes said non-contact IC cards, said recognition method comprising the steps of:

transmitting a first response signal from each of said non-contact IC cards to a predetermined time slot in response to a first polling trial by said reader/writer, randomly selecting a time slot among a predetermined number of succeeding time slots in response to a subsequent polling trial, transmitting a second response signal from each of said non-contact IC cards to the randomly selected time slot in response to the subsequent polling trial, receiving respective first response signals from said non-contact IC cards at the predetermined time slot by said reader/writer, and receiving respective second response signals from said non-contact IC cars at the predetermined number of time slots while executing polling trials subsequently.

10. The recognition method for non-contact IC cards as defined in claim 9, further comprising the step of prohibiting one of said non-contact IC cards from transmitting second response signal for the polling trial by said reader/writer once said one of said non-contact IC cards has been appointed by said reader/writer and executed a predetermined command processing.

* * * * *